(12) United States Patent
Hofmann

(10) Patent No.: US 9,133,312 B2
(45) Date of Patent: Sep. 15, 2015

(54) ISOCYANATE FREE POLYMERS AND METHODS OF THEIR PRODUCTION

(76) Inventor: Sylvia R. Hofmann, Berlin (DE)

( * ) Notice: Subject to any disclaimer, the term of this patent is extended or adjusted under 35 U.S.C. 154(b) by 0 days.

(21) Appl. No.: 14/240,028

(22) PCT Filed: Aug. 22, 2012

(86) PCT No.: PCT/EP2012/066352
§ 371 (c)(1),
(2), (4) Date: May 16, 2014

(87) PCT Pub. No.: WO2013/026882
PCT Pub. Date: Feb. 28, 2013

(65) Prior Publication Data
US 2014/0296359 A1 Oct. 2, 2014

(30) Foreign Application Priority Data

Aug. 22, 2011 (EP) .................................. 11178324
Jan. 12, 2012 (EP) .................................. 12150942
Mar. 19, 2012 (EP) .................................. 12160116

(51) Int. Cl.
C08G 63/02 (2006.01)
C08J 3/20 (2006.01)
C08L 75/06 (2006.01)
C08L 67/04 (2006.01)
C08L 69/00 (2006.01)
C08L 71/02 (2006.01)
C08L 75/04 (2006.01)

(52) U.S. Cl.
CPC ................ C08J 3/203 (2013.01); C08L 75/06 (2013.01); C08J 2375/04 (2013.01); C08J 2467/04 (2013.01); C08J 2469/00 (2013.01); C08K 2201/011 (2013.01); C08L 67/04 (2013.01); C08L 69/00 (2013.01); C08L 71/02 (2013.01); C08L 75/04 (2013.01)

(58) Field of Classification Search
USPC .......................... 528/44, 48; 264/176.1, 219
See application file for complete search history.

(56) References Cited

U.S. PATENT DOCUMENTS

2007/0135588 A1   6/2007   Diakoumakos et al.

FOREIGN PATENT DOCUMENTS

DE    10 2010 007820 A1   8/2011
WO    2005/066278 A1      7/2005

Primary Examiner — Terressa Boykin
(74) Attorney, Agent, or Firm — Agris & von Natzmer LLP; Joyce von Natzmer

(57) ABSTRACT

The invention relates to novel methods for producing isocyanate-free synthetic materials, such as plastics, polymers and/or modified polyurethanes, comprising melt extrusion processing of combinations of thermoplastic polyurethanes and nanoclays.

23 Claims, 17 Drawing Sheets

ISOCYANATE FREE POLYMERS AND METHODS OF THEIR PRODUCTION

CROSS-REFERENCE TO RELATED APPLICATIONS

Figure 1:
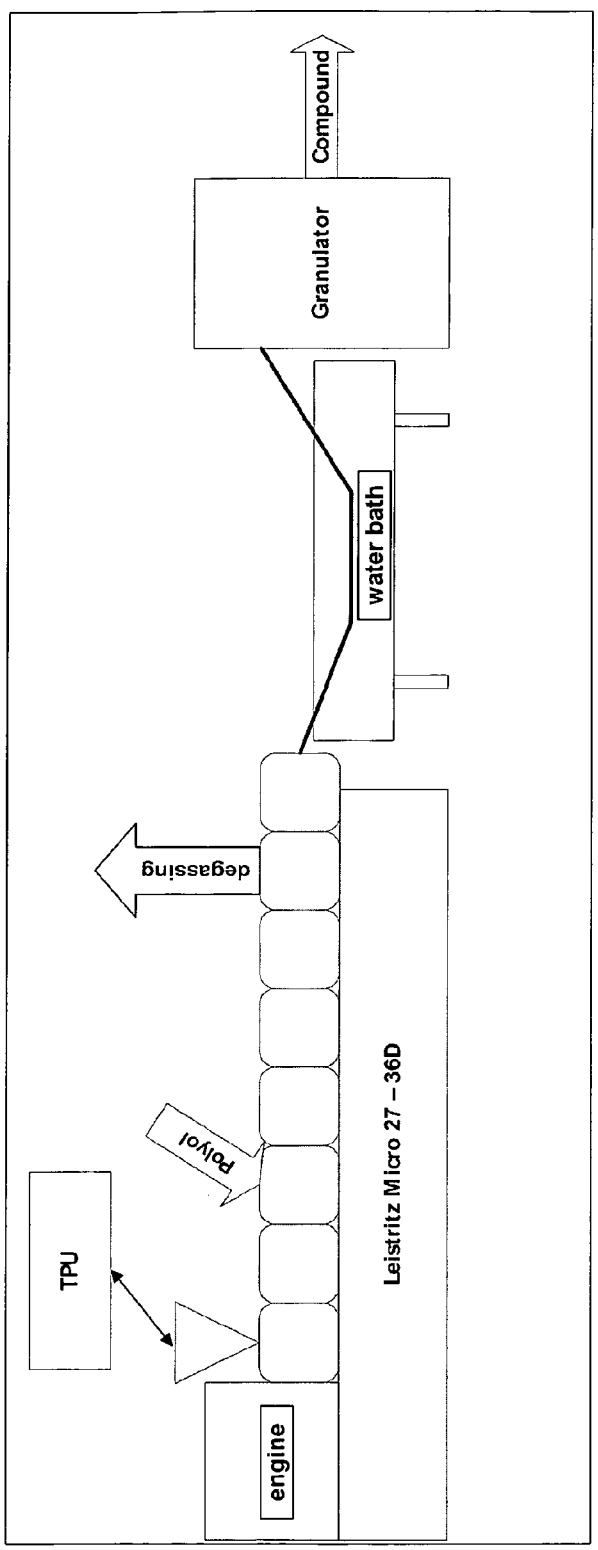

This is the U.S. national stage of International application PCT/EP2012/066352, filed Aug. 22, 2012 designating the United States and claiming priority to European patent applications EP11178324.7, filed Aug. 22, 2011, EP12150942.6, filed Jan. 12, 2012 and EP12160116.5, filed Mar. 19, 2012.

The invention relates to novel methods for producing isocyanate-free synthetic materials, such as plastics, polymers and/or modified polyurethans, comprising melt extrusion processing of combinations of thermoplastic polyurethane and nanoclays.

BACKGROUND OF THE INVENTION

Isocyanates are a substance class deriving from carbonic acid. Isocyanides can be described as instable carbamide acid (mono amide of carbonic acid which dissociates to ammonia and carbon dioxide). The isocyanates rapidly degrade into amines. With primary alcohol, isocyanates react to stable urethanes. Isocyanates are important for the plastics industry.

Technically, isocyanates are produced from synthesis of amines with phosgene. Two different principles can be differentiated: phosgenisation with free amines or phosgenisation with amine salts. Alternatively, di-isocyanates can be used for the isocyanate synthesis. Isocyanates show a high reactivity with reactive hydrogen. Due to this reason, on the one hand, the success and broad variety of chemical reactions can be explained. On the other hand, high toxicity and related side reactions also arise.

The addition reaction of isocyanates with hydrogen-active compounds is exothermic with a high reaction velocity. With water, isocyanates react more slowly. With amines the reaction time at room temperature is slow and carbon dioxide is eliminated. Aromatic isocyantes are more reactive than aliphatic isocyanates.

In addition to the addition reaction, isocyanates can polymerize H-active compounds. Depending on the individual reaction compounds and catalysts, the reaction results in linear polymers or cyclic di- or trimers. Isocyanates can trimerize with addition of alkali.

Due to the diversity of reactions it is necessary during polyurethane production to have an excess of isocyanate component. The formation of isocyanate products is reversible which is beneficial for the synthesis of blocked isocyanates. Generally, blocked isocyantes are an isocyanate, which has been transformed with a blocking reagent at elevated temperature in presence of a nucleophilic component into an isocyanate adduct. The first patents for isocyanate blocking derive from Schalck and Bunge 1939 and 1940. In comparison to the free isocyanates, the blocked isocyanates have significant advantages. They are less hazardous, less sensitive to hydrolytic reactions, easier for handle, easier to store and easier to transport. However, blocked isocyanates are also disadvantageous due to their difficulty in synthesis and associate costs in production.

The use of isocyanates in polymer production (in addition to the synthesis of blocked isocyanates) represents a significant disadvantage due to their toxicity to human users, the environment and the possibility of further chemical reactions with surrounding reactive materials.

The present invention relates to production methods for synthetic substances, for polymers and/or modified polyurethanes that avoid the likely risks of the conventional isocyanate use. Polyurethane bonding agents have excellent properties relating to stability during changes in temperature, to adhesion, as well as to stability against chemicals, humidity and solvents. Polyurethane materials are produced through polymerization reaction of a di-isocyanate with a di-alcohol and polyurethane-polyoles, which results in a multi-molecular cross-linked compound. A considerable disadvantage of such a polymerization reaction is the production of end products such as alcohols and isocyanates.

Isocyanates have a high level of reactivity, which is why they are used so successfully; but for that reason they are also toxic, being very likely to have a cancer generating effect. When isocyanates interact with H-active compounds, some of the products are also H-active and can, therefore, react with isocyanates as well. Research is needed to reduce the production of blocking agents and to avoid dangerous compounds like free isocyanates as well as phosgene. The goal of such research is to produce isocyanate-free polymer structures. When toxic isocyanates are used for the synthesis of polyurethane materials by conventional means, they remain a safety problem, since upon the hardening of the polymer network a certain amount of isocyanate material remains without having reacted with other materials. Hence the substitution of the isocyanates with non-poisonous cross-linking and/or adhesion materials is an important task.

SUMMARY OF THE INVENTION

The present invention relates to novel methods and production methods for plastics, polymers, synthetic materials and/or modified polyurethanes that avoid the likely risks of the conventional isocyanate use. Alternative cross-linking agents and/or adhesive materials are required that avoid the typical use of toxic components in synthetic material manufacture.

In light of the prior art the technical problem underlying the invention was the provision of methods for manufacture of synthetic materials, such as polymers, that avoid the use of isocyanate-based crosslinking.

This problem is solved by the features of the independent claims. Preferred embodiments of the present invention are provided by the dependent claims.

Therefore, an object of the invention is to provide a method for the isocyanate-free production of a synthetic material product I comprising
   a) Mixture of thermoplastic polyurethane (TPU) and a nanoclay component, thereby producing intermediate product I,
   b) Mixture of an intermediate product I obtained from a) with a polyol component, and optionally additional TPU, thereby producing intermediate product II,
   c) Mixture of an intermediate product II obtained from b) with a polycarbonate (PC) and/or polycaprolactone component (PCL), thereby producing product I.

In a preferred embodiment the method is characterised in that product I is subsequently processed to produce product II via extrusion, blowing, casting, grinding and/or spraying, to obtain particles, granules, films, fibres, foams, strands, sheets and/or foils.

In a preferred embodiment the method of the present invention is characterised in that step a) is carried out in two steps, namely
   i. the mixture of thermoplastic polyurethane (TPU) and a nanoclay component, thereby producing intermediate product Ia, followed by ii. the mixture of thermoplastic polyurethane (TPU) and intermediate product Ia, thereby producing intermediate product I.

In a preferred embodiment the method of the present invention is characterized in that the mixture in step a) occurs at a ratio of 70 to 99.99% thermoplastic polyurethane (TPU) and 0.01 to 30% nanoclay.

The present invention relates to a three step process (steps a) to c)). In a preferred embodiment a fourth step is carried out, namely that product I is subsequently processed to produce product II via extrusion, blowing, casting, grinding and/or spraying. The first step of the method is, in a preferred embodiment, carried out in two steps (steps i. and ii.).

The following terms are used to describe the products and intermediate products of the method:

Step a) leads to production of "intermediate product I". If step a) is carried out in two steps, the intermediate product of step i. is "intermediate product Ia". Step ii. subsequently leads to production of "intermediate product I".

"Intermediate product I" is also referred to as "TPU-1" or a "masterbatch" in various embodiments and experiments described herein.

Step b) leads to production of "intermediate product II". "Intermediate product II" is also referred to as "TPU-2" in various embodiments and experiments described herein.

Step c) leads to production of "product I". "Product I" is also referred to as "TPU-3" in various embodiments and experiments described herein.

The "product I" of step c) can be subsequently processed to produce "product II" via extrusion, blowing, casting, grinding and/or spraying. "Product II" is also referred to as "TPU-4" in various embodiments and experiments described herein.

In a preferred embodiment the method of the present invention is characterised in that the mixture in step i) occurs at a ratio of 70-90%, preferably 80%, thermoplastic polyurethane (TPU) and 10-30%, preferably 20%, nanoclay component.

In a preferred embodiment the method of the present invention is characterised in that the mixture in step ii) occurs at a ratio of 90-99%, preferably 97%, thermoplastic polyurethane (TPU) and 0.1-10%, preferably 3%, intermediate product Ia.

In a preferred embodiment the method of the present invention is characterised in that the mixture in step b) of claim 1 occurs at a ratio of
70-90%, preferably 80%, absolute TPU (considering the TPU present in the intermediate product I in addition to additionally added TPU), 10-90% intermediate product I, and 8-30%, preferably 20%, polyol component.

In a preferred embodiment the method of the present invention is characterised in that the mixture in step c) of claim 1 occurs at a ratio of 50-70%, preferably 60%, intermediate product II, 20-40%, preferably 28%, PC component and 6-18%, preferably 12%, PCL component.

In a preferred embodiment the method of the present invention is characterised in that the mixture of components in one or more steps occurs in a segmented single, twin or multiple screw melt extruder, preferably a single screw extruder.

In a preferred embodiment the method of the present invention is characterised in that the melting temperatures for one or more steps of the method is between 80 and 300 degrees C., preferably 140 to 250, more preferably approximately 200 degrees C.

In a preferred embodiment the method of the present invention is characterised in that the heating segments of the extruder exhibit different temperatures, whereby the temperatures in the segments increases with progression of the mixture through the extruder.

In a preferred embodiment the method of the present invention is characterised in that the extruder exhibits 3 to 20 heating segments, preferably 5 to 15 segments, more preferably 7 to 12 segments, whereby the temperature increases step-wise from 80 to 300 degrees C., preferably from 140 to 250 degrees C., with progression of the mixture through the extruder.

In a preferred embodiment the method of the present invention is characterised in that the extruder exhibits a screw of 3 to 20 screw segments, preferably 5 to 15 segments, whereby the screw rotates to homogenise the mixture, whereby the screw segments can exhibit the same or different configurations, which in turn determine homogenisation of the mixture.

In a preferred embodiment the method of the present invention is characterised in that the screw speed of the extruder is set to a value between 50 to 1000 revolutions per minute (rpm), preferably from 150 to 700 rpm, more preferably from 250 to 500 rpm.

In a preferred embodiment the method of the present invention is characterised in that the mixture of one or more steps is cooled after extrusion, preferably in a water bath.

A further aspect of the invention relates to a synthetic material obtainable by the method of the present invention.

A further aspect of the invention relates to a synthetic material produced by the method of the present invention.

The invention further relates to synthetic material, preferably produced by the method of the present invention, comprising
30 to 60%, preferably 45 to 55%, TPU,
8 to 30%, preferably 10 to 14%, Polyol,
0.001 to 5%, preferably 0.01 to 2%, Nanoclay,
20 to 40%, preferably 25 to 30%, PC, and
6 to 18%, preferably 10 to 14%, PCL.

A further aspect of the invention relates to a synthetic material comprising 47.712% TPU, 12.0% Polyol, 0.288% Nanoclay, 28% PC and 12% PCL. This mixture arises when the preferred values of TPU, Polyol, Nanoclay, PC and PCL as described above are combined, without additional TPU in step b).

A further embodiment of the invention is defined by a synthetic material of the following composition: 47.946% TPU, 12.0% Polyol, 0.054% Nanoclay, 28% PC and 12% PCL. This embodiment is produced according to example 9, whereby additional TPU is added in step b). The MB 2012-20-4 is a masterbatch TPU/nanoclay mixture (intermediate product I), whereby the amount of nanoclay component in MB 2012-20-4 is 0.6%.

DETAILED DESCRIPTION OF THE INVENTION

The invention in a preferred embodiment is characterised by a method for producing a novel synthetic material, comprising a combination of TPU, nanoclays, polyol, polycarbonate (PC) and/or polycaprolactone component (PCL). Extensive experimentation has shown that the order of combining the various components and the conditions under which each mixture takes place are important factors in producing the desired product.

Various problems in the methods of the prior art had existed in regards to each of the method steps of the present invention. For example, the TPU/nanoclay mixture requires substantial dilution of the nanoclay component in the TPU component, which can be a long and complicated process. Often the extruder process is not long enough and/or the mixture of a small concentration of nanoclay is not sufficiently uniform over the length of a normal extruder under normal homogeniser conditions. This step is a method step because if the nanoclay component is not sufficiently distributed in the TPU, the subsequent complex formation (polymerisation and/or adhesion with subsequent polyol, PC and/or PCL components) is sub-standard, producing a synthetic material that does not exhibit the desired properties described herein.

The mixture of TPU and nanoclay is in a preferred embodiment carried out in two mixture steps, thereby providing, in a quick and effective manner, a uniform mixture of the nanoclay within the TPU. Such a two-step mixture process has not been described previously and despite being potentially seen as an obvious method of dilution, this development over the prior art represents a surprisingly positive result in light of the previous difficulties in achieving sufficient nanoclay distribution in molten TPU. Considering the degree of distribution/homogenisation required, splitting the method into two easier processing steps represents a surprisingly fast and effective method.

The method is described in a preferred embodiment using the following interchangeable terms:

The first mixture step comprises mixture of thermoplastic polyurethane (TPU) and a nanoclay component, thereby producing intermediate product I. This product is also referred to in the examples as TPU-1. Alternatively, this mixture may be referred to as a masterbatch. This mixture may also be referred to as a TPU/nanoclay mixture.

This first mixture step is in a preferred embodiment carried out in two steps, namely a mixture of thermoplastic polyurethane (TPU) and a nanoclay component, thereby producing intermediate product Ia, followed by a subsequent mixture of thermoplastic polyurethane (TPU) and intermediate product Ia, thereby producing intermediate product I (TPU-1 or masterbatch). The intermediate product I is called masterbatch which is suitable for further processing with either additional components or further dilution with TPU. Preferably the intermediate I is diluted nanoclay. The TPU-1 comprises the nanoclays in a reduced concentration at the correct distribution for later mixture with polyol, PC and PCL components.

The second key mixture step comprises mixture of an intermediate product I with a polyol component, thereby producing intermediate product II. Intermediate product II is also described as TPU-2 in the examples.

The mixture of polyol into the intermediate product I has until now been a substantial hurdle in the production of such synthetic materials. Polyol components typically show poor solubility when brought into contact with TPU/nanoclay mixtures. In early experiments performed the polyol components were shown to exhibit poor solubility. Success can be achieved under various extrusion conditions, however, the conditions described in experiment according to example 8 represent a preferred embodiment, in which the polyol components shows sufficient solubility and homogenisation.

The preferred embodiment relates to extrusion with a single screw type extruder. One example of this is the "Buss-Ko-Kneter". Its distinguishing feature is that the screw shaft oscillates axially once per revolution in sinusoidal motion generated by a synchronized drive. The characteristic kneading flights on the screw shaft interact with fixed kneading teeth or kneading bolts inside the Kneader barrel so that the various ingredients are sheared between them much more directly and rapidly than with other systems. Furthermore, the oscillating screw shaft ensures intensive mixing in the axial direction through repeated product separation, folding and reorientation. This unique operating principle results in outstandingly good distributive mixing thanks to optimal distribution of the product components. That is particularly important if the melt viscosities and ranges of the various components vary widely, and if liquid ingredients or high proportions of fibres or fillers have to be incorporated. The dispersive mixing effect is also more efficient than with other systems, because there is no risk of product damage due to pressure peaks or high radial pressures. After each shear cycle the matrix depressurizes by expanding into neighbouring ducts for separation, folding and reorientation before the next shear cycle.

Among the notable benefits of the present invention with respect to the mixtures, in particular when introducing the polyol component, are the extremely low processing length/diameter ratios, the short residence times, and lower product temperatures by comparison with other systems. Another important advantage is the high degree of self-cleaning.

It was a surprising and advantageous finding, that the polyol mixture with the intermediate product I showed such good solubility and homogenisation.

The earlier experiments of example 7 show some success, in which the polyol components are soluble, although not entirely. These mixtures are however suitable for later processing in the subsequent steps, although not as preferred as the intermediate substance II of experiments according to example 8.

The third key mixture step comprises mixture of an intermediate product II (TPU-2) with a polycarbonate (PC) and/or polycaprolactone component (PCL), thereby producing product I. The product I is also described as TPU-3 in the experimental examples.

The product I (TPU-3) is subsequently processed, if so desired, to produce product II (also described as E-TPU) via extrusion, blowing, casting, grinding and/or spraying, to obtain particles, granules, films, fibres, foams, strands, sheets and/or foils. In this embodiment the appropriate processor machinery must be applied, in order to produce the "final" form of the material. If a granulate is required, then a granulator is used. Alternatively, foaming or spraying of the materiel is possible. The product II can however be re-processed, meaning it can be melting again and reprocessed to form another new form or application. The product is stable through re-processing, allowing recycling of the material when required.

The synthetic material of the present invention relates to a plastic substance or polymer comprising of a cross-linked and/or adhesive mixture of thermoplastic polyurethane (TPU) and nanoclays. In a preferred embodiment the product comprises a combination of TPU, nanoclays, polyol, polycarbonate (PC) and/or polycaprolactone component (PCL).

The synthetic material produced through the method of the present invention exhibits a novel chemical structure, produced by the unique combination of components and processing steps as described herein. The resulting chemical structure is preferably a combination of polymerisation and adhesion, whereby the nanoclays component acts as catalyst of a chemical reaction, leading to polymerisation and/or re-polymerisation of the reaction components, or as an adhesive component, providing strong adhesion between the components resulting in long-lasting and stable isocyanate free synthetic materials. Preferably the polymerisation comprises additionally or exclusively of polyaddition reactions. The synthetic material described herein may be described either as polymer or synthetic material or plastic or modified polyurethane, without intending to describe separate products. The materials produced via the method of the invention show a novel structure that may be a combination of polymerisation and/or adhesion.

Thermoplastic Polyurethane (TPU)

A thermoplastic polyurethane (TPU) is polymer composed of a chain of organic units joined by carbamate (urethane) links. TPU is defined as any thermoplastic polyurethane. The present invention may be carried out with any TPU. TPU may be used in a milled or grinded grade.

The following TPUs are preferred:
Pearlcoat 162K
Pearlthane 16N80
Pearlthane Clear 15N80
Desmopan 385 S
Elastollan 1185 A In a preferred embodiment Pearlcoat 162K comprises a polyether based TPU, supplied in form of translucent, colourless pellets, combining hardness with excellent low temperature flexibility and very good hydrolysis resistance. Typical properties are listed in the following table:

| Physical Property | Test Method | Values |
| --- | --- | --- |
| Density @ 20° C. | DIN 53.479 | 1.11 g/cm³ |
| Shore Hardness | DIN 53.505 | 82 A |
| Tensile Strength | DIN 53.504 | 30 MPa |
| Modulus @ 100% Elongation | DIN 53.504 | 5 MPa |
| Modulus @ 300% Elongation | DIN 53.504 | 10 MPa |
| Elongation @ Break | DIN 53.504 | 550% |
| Abrasion Loss | DIN 53.516 | 25 mm3 |
| Melting Range (MFI = 10**) | MQSA 111 | 145-155° C. |
| Tg (DSC, 10° C./min.) | DIN 51.007 | −42° C. |

**Temperature at which MFI = 10 g/10 min @ 216 kg.

Pearlcoat 162K is preferably used in melt coatings on textile substrates, for preferably end-uses in industrial coatings (for life-jackets, etc.) obtained by extrusion and calendering. Pearlcoat 162K is preferably used for obtaining extruded films and fabric coatings. The preferred working instructions can be described as follows and the characteristics of the extruder that are suitable for processing Pearlcoat 162K are the following:

1. L/D ratio between 25:1 and 30:1
2. The extruder screw preferably has 3 or more zones and a compression ratio in between 2:1 and 3:1 (Usually, the screws that are used for Polyethylene extrusion give good results).
3. The extruder screw should preferably have a continuous regulation device and a working power higher than for processing other plastics.
4. The speed of the extruder should preferably be low (12 to 60 rpm, depending on its diameter), so as to avoid material degradation due to shearing.
5. The filters used should preferably be disks with holes of 1.5 to 5 mm. (depending on the screw and the die), and screen packs (the number of meshes/cm² will depend on the end product that is processed), so as to create a pressure built-up.

For optimum results, previous drying of the product during 2 hours at 90-100° C. is advisable, in a hot air circulatory, vacuum or desiccant-air dryer. The suggested processing-temperature profiles for film extrusion (flat film) are given in the table below.

| Zone | 1 | 2 | 3 | 4 | DIE |
| --- | --- | --- | --- | --- | --- |
| PROFILE 162K/1 | 160 | 170 | 180 | 185 | 185 |
| PROFILE 162K/2 | 170 | 180 | 190 | 195 | 195 |

Preferred process parameter (extruder and conditions) can be described as follows: TYPE.—30/25D (L/D=25:1), COOLING.—Air, SCREW.—3:1, SPEED.—50 rpm BREAKER PLATE.—, FILTER PACK.—, THICKNESS DIE.—0.2 mm, PRE-DRYING.—1 h @100

In a preferred embodiment Pearlthane 16N80 comprises a polyether based TPU, preferably supplied in form of translucent, colourless pellets, combining hardness with excellent mechanical properties and an outstanding hydrolysis, microbial resistance. It can preferably be extruded and injection-moulded. Pearlthane 16N80 can preferably be used for blown- and cast films, cables, tubing and profiles. When processed by injection moulding, it can be used for making technical parts. Typical properties are listed in the following table:

| Physical Property | Test Method | Values |
| --- | --- | --- |
| Density @ 20° C. | ISO 2781 | 1.09 g/cm³ |
| Shore Hardness | ISO 868 | 81 A |
| Tensile Strength | ISO 527 | 35 MPa |
| Elongation @ Break | ISO 527 | 760% |
| Modulus @ 100% Elongation | ISO 527 | 5 MPa |
| Modulus @ 300% Elongation | ISO 527 | 8 MPa |
| Tear Strength | ISO 34-1B | 80 kN/m |
| Abrasion Loss | ISO 4649 | 20 mm³ |
| Compression Set (70 h. @ 23° C.) | ASTM D395B | 30% |
| Compression Set (24 h. @ 70° C.) | ASTM D395B | 42% |
| Moisture Content | MQSA 44 | <0.1% |
| Melting Range (MFI = 10**) | MQSA 111 | 160-170° C. |
| Tg (DSC, 10° C./min.) | ISO 11357-2 | −47° C. |

**Temperature at which MFI = 10 g/10 min @ 21.6 kg.

Preferred working instructions are the following and for optimum results, previous drying of the product during 1-2 hours at 100-110° C. is advisable, in a hot air circulatory, vacuum or desiccant-air dryer. In extrusion processes the characteristics and the extruder that is suitable for processing Pearlthane 16N80 are the following:

1. L/D ratio between 25:1 and 30:1
2. The extruder screw preferably has 3 or more zones and a compression ratio in between 2:1 and 3:1 (usually, the screws that are used for Polyethylene extrusion give good results).
3. The extruder screw should preferably have a continuous regulation device and a working power higher than for processing other plastics.
4. The speed of the extruder should preferably be low (12 to 60 rpm, depending on its diameter), so as to avoid material degradation due to shearing.
5. The filters used should preferably be disks with holes of 1.5 to 5 mm. (depending on the screw and the screen packs (the no. of meshes/cm² will depend on the end product that is processed), so as to create a pressure built-up.

The preferred processing-temperature profiles for film extrusion (flat films) are given in the table below:

| Zone 1 | 180° C. | 195° C. |
| --- | --- | --- |
| Zone 2 | 190° C. | 210° C. |
| Zone 3 | 200° C. | 220° C. |
| Zone 4 | 185° C. | 200° C. |
| Die | 185° C. | 195° C. |

Preferred process parameter can be described as follows: Type—30/25d (I/d=25:1), Cooling.—Air, Screw.—3:1, Speed.—50 rpm Breaker plate. —Filter. —. Thickness Die.—0.2 mm, Pre-heating.—1 h @ 105° C. For injection molding the preferred parameter are the following: The obtained data are based on plaques produced in an injection moulding equipment with the following characteristics and suggested processing conditions:

| | |
|---|---|
| Feeding zone | 180° C. |
| Compression zone | 190° C. |
| Metering zone | 195° C. |
| Nozzle | 195° C. |
| Mould temperature | 35° C. |
| Closing force | 30 tons |
| Screw diameter | 26 mm |
| L/D ratio | 23 |
| Maximum hydraulic pressure | 210 bar |
| Mould | Plaque 120 × 120 × 2 |

In a preferred embodiment Pearlthane Clear 15N80 comprises a polyether copolymer-based TPU, preferably supplied in form of translucent, colorless, combining low hardness with excellent mechanical properties and excellent hydrolysis resistance. Pearlthane Clear 15N80 can preferably be extruded and injection-molded. Pearlthane Clear 15N80 is preferably used for making films, cables, tubing, profiles and different technical parts. To improve the microbiological protection of Pearlthane Clear 15N80, it could be necessary to add a biocide, preferably in form of TPU-based masterbatch. Typical properties are listed in the following table:

| Physical Property | Test Method | Values |
|---|---|---|
| Specific Gravity | ASTM D-792 | 1.05 |
| Shore Hardness | ASTM D-2240 | 82 A |
| Tensile Strength | ASTM D-412 | 5076 psi. |
| Elongation @ Break | ASTM D-412 | 740% |
| Modulus @ 100% Elongation | ASTM D-412 | 725 psi. |
| Modulus @ 300% Elongation | ASTM D-412 | 1160 psi. |
| Tear Strength | ASTM D-624 (Die C) | 460 lb/in |
| Abrasion Loss | DIN 53.516 | 25 mm$^3$ |
| Compression Set (70 h. @ 73° F.) | ASTM D-395 | 24% |
| Compression Set (24 h. @ 158° F.) | ASTM D-395 | 38% |
| Moisture Content | MQSA 44 | <0.1% |
| Melting Range (MFI = 10**) | MQSA 111 | 385-400° F. |
| Tg (DSC, 10°/10 min) | DIN 51.007 | −65° F. |

**Temperature at which MFI = 10 g/10 min @ 21.6 kg.

Preferred working instructions are the following and for optimum results, previous drying of the product during 1-2 hours at 210-230° F. is advisable, in a hot air circulatory, vacuum or desiccant-air dryer. In extrusion processes the characteristics and the extruder that is suitable for processing Pearlthane Clear 15N80 are the following:
1. L/D ratio between 25:1 and 30:1
2. The extruder screw preferably has 3 or more zones and a compression ratio between 2:1 and 3:1. (Usually, the screws that are used for Polyethylene extrusion give good results).
3. The extruder screw should preferably have a continuous regulation device and a working power higher than for processing other plastics.
4. The speed of the extruder should preferably be low (12 to 60 rpm, depending on its diameter), so as to avoid material degradation due to shearing.
5. The filters used should preferably be disks with holes of ⅟₁₆ to ³⁄₁₆ in (depending on the screw and the die), and screen packs (the no. of meshes/in$^2$ will depend on the end product which is processed), so as to create a pressure built-up.

The preferred processing-temperature profiles for film extrusion (flat film) are given in the table below:

| Zone | 1 | 2 | 3 | 4 | DIE |
|---|---|---|---|---|---|
| PROFILE CLEAR 15N80/1 | 365 | 385 | 410 | 355 | 365 |
| PROFILE CLEAR 15N80/1 | 385 | 410 | 435 | 385 | 385 |

Preferred process parameter (extruder and conditions) can be described as follows: TYPE.—30/25D (L/D=25:1), COOLING.—Air, SCREW.—3:1, SPEED.—25 rpm., BREAKER PLATE.—, FILTER PACK.—, THICKNESS DIE.—0.2 mm, PRE-DRYING.—1 h @ 220° F.

Preferred characteristic of the film are the following:

| | |
|---|---|
| Appearance: | Colourless, elastic, translucent |
| Softening point: | 310-330° F. (MQSA 91 (Kofler)) |
| Dry cleaning resistance: | Excellent |
| Hydrolysis resistance: | Excellent |

Based on an injection molding equipment with the following characteristics

| | |
|---|---|
| Closing force: | 30 tons |
| Screw diameter: | 1.02 in |
| L/D ratio: | 23 |
| Maximum hydraulic pressure: | 3050 psi. |
| Mold: | Plaque 4.7 × 4.7 × 0.08 in, | the preferred processing conditions for injection molding are as follows:

| | |
|---|---|
| Injection pressure | 1450 psi |
| Injection time | 4 sec |
| Holding pressure | 700 psi |
| Holding time | 10 sec |
| Cooling time | 30 sec |
| Feed zone | 365° F. |
| Compression zone | 375° F. |
| Metering zone | 385° F. |
| Nozzle | 390° F. |
| Mold temperature | 95° F. |
| Screw speed: | approx. 142 rpm. |

In a preferred embodiment Desmopan 385 S comprises aromatic thermoplastic polyurethanes and/or polyurethane elastomers, preferably with less than 1% 2,2',6,6'-Tetraisopropyldiphenyl Carbodiimide (CAS-No. 2162-74-5). The preferred storage temperature maximum is 30° C. The material is hygroscopic and may absorb small amounts of atmospheric moisture. According to the present invention a polymer comprising Desmopan 385 S preferably shows the following physical and chemical properties:

| | |
|---|---|
| Form: | solid |
| Appearance: | pellets |
| Color: | Natural |
| Odor: | Odorless |
| pH: | not applicable |
| Melting Point: | 220° C. (428° F.) |
| Flash point: | 250° C. (482° F.) |

-continued

| | |
|---|---|
| Lower explosion limit: | not applicable |
| Upper explosion limit: | not applicable |
| Specific Gravity: | 1.1 |
| Solubility in Water: | insoluble |
| Autoignition temperature: | >210° C. (>410° F.) |
| Decomposition temperature: | Decomposition begins at 230° C. |
| Softening point: | 180° C. (356° F.) |
| Bulk density: | 500-700 kg/m3 |
| Hazardous Reactions: | Hazardous polymerisation does not occur. |
| Stability: | Stable |
| Materials to avoid: | None known. |
| Conditions to avoid: | None known. |

In a further preferred embodiment the injection molding grade preferably shows high mechanical strength and improved hydrolysis resistance. The following table comprises preferred properties of the polymer to be used and/or obtained from the method of the present invention.

| Mechanical properties (23° C./50% r.h.) | | | | |
|---|---|---|---|---|
| Property | Test Condition | Unit | Standard | Value |
| shore hardness, | — | | ISO 868 | 85 |
| shore hardness, | — | | ISO 868 | 32 |
| Ultimate tensile strength | 200 mm/min | MPa | acc. ISO 527-1, -3 | 40 |
| Elongation at break | 200 mm/min | % | acc. ISO 527-1, -3 | 450 |
| Stress at 100% strain | 200 mm/min | MPa | acc. ISO 527-1, -3 | 6.0 |
| Stress at 300% strain | 200 mm/min | MPa | acc. ISO 527-1, -3 | 17 |
| Compression set | 24 h; 70° C. | % | ISO 815 | 55 |
| Compression set | 72 h, 23° C. | % | ISO 815 | 30 |
| Abrasion resistance | | mm$^3$ | ISO 4649 | 30 |
| Impact resilience | | % | ISO 4662 | 42 |
| Tear propagation | 500 mm/min | kN/m | ISO 34-1 | 70 |
| Thermal properties | | | | |
| Torsional storage modulus | −20 | MP | ISO | 32 |
| Torsional storage modulus | 23° C. | MPa | ISO 6721-2 | 12 |
| Torsional storage modulus | 70° C. | MPa | ISO 6721-2 | 8, 7 |
| Other properties (23° C.) | | | | |
| Density | | kg/m$^3$ | ISO 1183 | 1200 |
| Molding conditions | | | | |
| Injection molding-Melt temperature | | ° C. | | 210-230 |
| Injection molding-Mold temperature | | ° C. | | 20-40 |

In a preferred embodiment Elastollan 1185 A comprises a thermoplastic polyether-polyurethane with outstanding hydrolysis resistance, low temperature flexibility and high resistance to micro-organisms. The polymer is processable preferably by injection moulding, extrusion and blow moulding. According to the present invention a polymer comprising Elastollan 1185 A preferably shows the following characteristics:

| Property | Unit | Value | Test method according to |
|---|---|---|---|
| Hardness | Shore A | 87 | DIN 53505 |
| | Shore D | 36 | |
| Density | g/cm$^3$ | 1.12 | DIN EN ISO 1183-1-A |
| Tensile strength | MPa | 45 | DIN 53504-S2 |
| Elongation at break | % | 600 | DIN 53504-S2 |
| Stress at 20% elongation | MPa | 2.5 | DIN 53504-S2 |
| Stress at 100% elongation | MPa | 6 | DIN 53504-S2 |
| Stress at 300% elongation | MPa | 10 | DIN 53504-S2 |
| Tear strength | N/mm | 70 | DIN ISO 34-1Bb |
| Abrasion loss | mm$^3$ | 25 | DIN ISO 4649-A |
| Compression set 23° C./72 hrs | % | 25 | DIN ISO 815 |
| Compression set 70° C./24 hrs | % | 45 | DIN ISO 815 |
| Tensile strength after storage in water at 80° C. for 42 days | MPa | 32 | DIN 53504-S2 |
| Elongation at break after storage in water at 80° C. for 42 days | % | 600 | DIN 53504-S2 |
| Notched impact strength (Charpy) | +23° C. kJ/m$^2$ | no break | DIN EN ISO 179-1 |
| | −30° C. kJ/m$^2$ | no break | |
| Flammability rating | | HB | UL 94 |

Test plaques are preferably manufactured by injection moulding from pre-dried granules and water content of less than 0.02%. Test plaques are preferably aged 20 hrs at 100° C. Specimens are cut from test plaques. Test conditions are 23° C.±2° C. and 50%±6% rel. humidity. Polymers comprising Elastollan are hygroscopic, therefore storage in dry conditions and original container is recommended. In a preferred form the polymer product comprises lentil shaped pellets. In a preferred embodiment the Elastollan polymer is processable at least for 6 months from delivery date in original sealed containers with cool dry storage.

Nanoclays

Nanoclays are nanoparticles of layered mineral silicates. Depending on chemical composition and nanoparticle morphology, nanoclays are organized into several classes such as montmorillonite, bentonite, kaolinite, hectorite, and halloysite. Organically-modified nanoclays (organoclays) are an attractive class of hybrid organic-inorganic nanomaterials with potential uses in polymer nanocomposites, as rheological modifiers, gas absorbents and drug delivery carriers. Nanoclays can come in the form of nanoplatelets. The silicate platelets that the additives are derived from are about 1 nanometer thick and 70-150 nanometers across. The platelets are surface modified with an organic chemistry to allow complete dispersion into and provide miscibility with the thermoplastic systems for which they were designed to improve. The additives can reinforce thermoplastics by enhancing flexural and tensile modulus. Nanoparticles, preferably in the form of masterbatches, or so called nano masterbatches, influence the adhesion and/or crosslinking of the components during production, preferably polymerization, melting and/or extrusion. Furthermore it is preferred, that nano masterbatches influence the viscosity in the melt and surface properties of the hardened polymer.

A preferred nanoclay is Perkalite F100, or derivatives of and/or mixtures including Perkalite F100, which is an aluminum magnesium layered double hydroxide (LDH) modified with hydrogenated fatty acid.

Preferably the composition on ingredients for Perkalite F100 is as follows:

| Chemical Description |
|---|
| Aluminium magnesium carbonate hydroxide modified with organic compound |
| Composition/information on ingredients |

| Number | % w/w | CAS-number | Chemical name |
|---|---|---|---|
| 1 | 40-60 | 039366-43-3 | Aluminum magnesium hydroxide |
| 2 | 40-60 | 067701-03-5 | Hydrogenated fatty acid |

Preferably the physical and chemical properties for Perkalite F100 are as follows:

| | |
|---|---|
| Appearance | powder |
| Colour | off white |
| Odour | characteristic |
| Melting point/freezing point | >500 °C./>932 F. |
| Flash point | not applicable. Product may contain flammable volatiles. |
| Flammability | combustible material. |
| Explosive properties | no |
| Oxidising properties | no |
| Vapour pressure | not applicable |
| Density | 1378 kg/m$^3$ (20 °C./68' F.) |
| Specific gravity | = 1.378 (20 °C./68 F.) |
| Bulk density | 211-219 kg/m$^3$ (20 °C./68' F.) |
| Specific gravity | = 0.211-0.219 (20 °C./68 F.) |
| Solubility in water | Insoluble (20 °C./68 F.) |

Preferably the stability properties for Perkalite F100 are as follows:

| | |
|---|---|
| Conditions to avoid | No specific recommendations. |
| Chemical stability | Stable under recommended storage and handling conditions |
| Incompatible materials | Keep away from oxidising agents, strong acid and strong alkaline. |
| Possibility of hazardous reactions | Polymerization does not occur. |

Masterbatch

Masterbaches comprise of a solid product of a plastic, rubber, polyol, elastomer and/or polymer in which pigments, additives, clays, nanoclays, silicates, composites and/or nanocomposites are optimally dispersed at high concentration in a carrier material. The carrier material is compatible with the main plastic, rubber, polyol, elastomer and/or polymer in which it will be blended during molding, whereby the final plastic, rubber, polyol, elastomer and/or polymer obtains the color and/or properties from the masterbatch.

In a preferred embodiment of the present invention masterbatches preferably comprise clays, silicates and/or nanoclays and are preferably used according to the invention for the manufacturing, polymerisation and/or recycling of monomers, oligomers, polymers and/or pre-polymers. It is further preferred that masterbatches are preferably used for enhancing the monomers, oligomers, polymers and/or pre-polymers properties. These enhanced properties are comprising in particular strength, hardness, elongation break, viscosity, handling, manufacturability, stability and/or processability. Additives and/or non-isocyanate polymerizing agents in masterbatches are comprising according to the present invention monomers, oligomers, polymers and/or pre-polymers. In a preferred embodiment masterbatches are used as non-isocyanate polymerizing agent. In a preferred embodiment a masterbatch is dispersed via extrusion in a polymer matrix. Masterbatches are preferably comprising a solid content of up to 50%, more preferably of up to 90% and most preferably of up to 99%.

Polyol

A polyol is an alcohol containing multiple hydroxyl groups. Polyol is defined as any polyol. The present invention may be carried out with any polyol.

The following polyol components are preferred:

Lupraphen 8113
Lupraphen 8109
Lupraphen 8108
Lupraphen 8107
Lupraphen 8106
Lupraphen 8104
Lupraphen 8103
Lupraphen 8101
Lupraphen 8008
Lupraphen 8007
Lupraphen 8004
Lupranol BALANCE 50
Lupranol VP 9390
Lupranol 4674-15
Lupraphen VP 9267

In a preferred embodiment Lupraphen 8113 comprises a difunctional, aliphatic, polyester polyol. Lupraphen 8113 is preferably used for the production of polyurethane elastomers. Typical properties are listed in the following table:

| Appearance: | colourless to slightly yellow solid | |
|---|---|---|
| OH Number | 55 mg KOH/g | DIN 53 240 |
| Viscosity at 75° C. | 580 mPa · s | DIN EN 12092 |
| Water Content | ≤0.015% | DIN 51 777 |
| Acid Number | ≤0.45 mg KOH/g | DIN EN ISO 2114 |
| Density at 50° C. | 1.2 g/cm$^3$ | DIN 51 757 |
| Flash point | >160° C. | DIN EN 22 719 |

Lupraphen 8113 is a polymer or no-longer-polymer, made from monomers, which are listed in the German consumer goods regulation, annex 3, paragraph A or B as well as in the directive 90/128/EG (Europe) and its amendments (latest: 96/11/EC), in annex II, paragraph A or B. The components of Lupraphen 8113 or its product groups are listed in the BgVV (Germany) as Codes of Practice No. XXVIII dated Jun. 1, 1981, and XXXIX dated Jun. 1, 1998. The components of Lupraphen 8113 or its product groups or the polyurethanes made from Lupraphen 8113 are listed in the 21 CFR, part 175 105 (edition of Apr. 1, 1998) of FDA (USA). Lupraphen 8113 is not classified as dangerous for supply according to the EC directive 67/548 and its amendments. Lupraphen 8113 is preferably supplied in road tankers and non-returnable drums. After supply the product may preferably be stored under appropriate conditions for at least six months. The storage temperature should be as close as possible to the temperature at which the material will be processed. Short term warming or cooling of the product to low temperatures preferably does not damage the product. It should however be noted that at low temperatures viscosity increases markedly and this may cause difficulties in processing. Moist and wet conditions are to be avoided.

In a preferred embodiment Lupraphen 8109 comprises a partially-branched, aliphatic polyester polyol. Lupraphen 8109 is preferably used for the production of polyurethane flexible integral skin foams, elastomers and shoe sole systems. Typical properties are listed in the following table:

| Appearance: | colourless to slightly yellow, viscous liquid | |
|---|---|---|
| OH Number | 55 mg KOH/g | DIN 53 240 |
| Viscosity at 75° C. | 700 mPa · s | DIN 53 015 |
| Water Content | ≤0.10 % by weight | DIN 51 777 |
| Acid Number | ≤1.0 mgKOH/g | DIN EN ISO 3682 |
| Density at 25° C. | 1.2 g/cm³ | DIN 51 757 |
| Flash point | >160° C. | DIN EN 22 719 |

Lupraphen 8109 is a polymer or no-longer-polymer, made from monomers, which are listed in the German consumer goods regulation, annex 3, paragraph A or B as well as in the directive 90/128/EG (Europe) and its amendments (latest: 96/11/EC), in annex II, paragraph A or B. The components of Lupraphen 8109 or its product groups or the polyurethanes made from Lupraphen 8109 are listed in the 21 CFR, part 175 105 (edition of Apr. 1, 1998) of FDA (USA). Lupraphen 8109 has not to be marked according to the EC directive 67/548 and its guidelines. Lupraphen 8109 is supplied in road tankers and non-returnable drums. After supply the product may preferably be stored under appropriate conditions for at least six months. The storage temperature should preferably be as close as possible to the temperature at which the material will be processed. Short term warming or cooling of the product to low temperatures preferably does not damage the product. It should however be noted that at low temperatures viscosity increases markedly and this may cause difficulties in processing. Moist and wet conditions are to be avoided.

In a preferred embodiment Lupraphen 8108 comprises a difunctional, aliphatic polyester polyol. Lupraphen 8108 is preferably used for the production of polyurethane flexible integral skin foams, elastomers and textile coatings. Typical properties are listed in the following table:

| Appearance: | colourless to slightly yellow, viscous liquid | |
|---|---|---|
| OH Number | 56 mg KOH/g | DIN 53 240 |
| Viscosity at 75° C. | 613 mPa · s | DIN 53 015 |
| Water Content | ≤0.07% | DIN 51 777 |
| Acid Number | ≤0.4 mgKOH/g | DIN EN ISO 3682 |
| Density at 25° C. | 1.15 g/cm³ | DIN 51 757 |
| Colour | ≤3 Iodine | DIN 6162 |
| Flash point | >160° C. | DIN EN 22 719 |

Lupraphen 8108 is a polymer or no-longer-polymer, made from monomers, which are listed in the German consumer goods regulation, annex 3, paragraph A or B as well as in the directive 90/128/EG (Europe) and its amendments (latest: 96/11/EC), in annex II, paragraph A or B. The components of Lupraphen 8108 or its product groups or the polyurethanes made from Lupraphen 8108 are listed in the 21 CFR, part 175 105 (edition of Apr. 1, 1998) of FDA (USA). Lupraphen 8108 has not to be marked according to the EC directive 67/548 and its guidelines. Lupraphen 8108 is supplied in road tankers and non-returnable drums. After supply the product may preferably be stored under appropriate conditions for at least six months. The storage temperature should preferably be as close as possible to the temperature at which the material will be processed. Short term warming or cooling of the product to low temperatures does preferably not damage the product. It should however be noted that at low temperatures viscosity increases markedly and this may cause difficulties in processing. Moist and wet conditions are to be avoided.

In a preferred embodiment Lupraphen 8107 comprises a partially-branched, aliphatic, polyester polyol. Lupraphen 8107 is preferably used for the production of polyurethane slab stock foam. Typical properties are listed in the following table:

| Appearance: | Colourless to pale yellow, viscous liquid | |
|---|---|---|
| OH Number | 61 mg KOH/g | DIN 53 240 |
| Viscosity at 25° C. | 19000 mPa · s | DIN 53 015 |
| Viscosity at 75° C. | 1050 mPa · s | DIN 53 015 |
| Water Content | ≤0.07% | DIN 51 777 |
| Acid Number | ≤1.5 mgKOH/g | DIN EN ISO 2114 |
| Density at 25° C. | 1.19 g/cm³ | DIN 51 757 |
| Colour | ≤2 Iodine | DIN 6162 |
| Flash point | >160° C. | DIN EN 22 719 |

Lupraphen 8107 is a polymer or no-longer-polymer, made from monomers and additives, which are listed in the directive 90/128/EG (Europe) and its amendments (latest: 2004/19/EG), in annexe II, paragraph A or B or annex III, paragraph A or B. The components of Lupraphen 8107 or its product groups or the polyurethanes made from Lupraphen 8107 are listed in the 21 CFR, part 175 105 (edition of Apr. 1, 1998) of FDA (USA). Lupraphen 8107 is not classified as dangerous for supply according to the EC directive 67/548 and its amendments. Lupraphen 8107 is supplied in road tankers and non-returnable drums. After supply the product may preferably be stored under appropriate conditions for at least six months. The storage temperature should preferably be as close as possible to the temperature at which the material will be processed. Short term warming or cooling of the product to low temperatures preferably does not damage the product. It should however be noted that at low temperatures viscosity increases markedly and this may cause difficulties in processing. Moist and wet conditions are to be avoided.

In a preferred embodiment Lupraphen 8106 comprises a difunctional, aliphatic polyester polyol. Lupraphen 8106 is preferably used for the production of polyurethane elastomers. Typical properties are listed in the following table:

| Appearance: | white to slightly yellow, solid product | |
|---|---|---|
| OH Number | 56 mg KOH/g | DIN 53 240 |
| Viscosity at 75° C. | 563 mPa · s | DIN 53 015 |
| Water Content | ≤0.06% by weight | DIN 51 777 |
| Acid Number | ≤0.8 mg KOH/g | DIN EN ISO 3682 |
| Density at 25° C. | 1.15 g/cm³ | DIN 51 757 |
| Flash point | >160° C. | DIN EN 22 719 |

Lupraphen 8106 is a polymer or no-longer-polymer, made from monomers, which are listed in the German consumer goods regulation, annex 3, paragraph A or B as well as in the directive 90/128/EG (Europe) and its amendments (latest: 96/11/EC), in annex II, paragraph A or B. The components of Lupraphen 8106 or its product groups or the polyurethanes made from Lupraphen 8106 are listed in the 21 CFR, part 175

105 (edition of Apr. 1, 1998) of FDA (USA). Lupraphen 8106 is not classified as dangerous for supply according to the EC directive 67/548 and its amendments. Lupraphen 8106 is supplied in road tankers and non-returnable drums. After supply the product may preferably be stored under appropriate conditions for at least six months. The storage temperature should preferably be as close as possible to the temperature at which the material will be processed. Short term warming or cooling of the product to low temperatures preferably does not damage the product. It should however be noted that at low temperatures viscosity increases markedly and this may cause difficulties in processing. Moist and wet conditions are to be avoided.

In a preferred embodiment Lupraphen 8104 comprises a difunctional, aliphatic polyester polyol. Lupraphen 8104 is preferably used for the production of compact and cellular polyurethane elastomers. Typical properties are listed in the following table:

| Appearance: | slightly yellow, waxlike product | |
| --- | --- | --- |
| OH Number | 56 mg KOH/g | DIN 53 240 |
| Viscosity at 75° C. | 650 mPa·s | DIN 53 015 |
| Water Content | ≤0.10% by weight | DIN 51 777 |
| Acid Number | ≤1.2 mgKOH/g | DIN EN ISO 3682 |
| Density at 25° C. | 1.16 g/cm³ | DIN 51 757 |
| Flash point | >160° C. | DIN EN 22 719 |

Lupraphen 8104 is a polymer or no-longer-polymer, made from monomers, which are listed in the German consumer goods regulation, annex 3, paragraph A or B as well as in the directive 90/128/EG (Europe) and its amendments (latest: 96/11/EC), in annex II, paragraph A or B. The components of Lupraphen 8104 or its product groups or the polyurethanes made from Lupraphen 8104 are listed in the 21 CFR, part 175 105 (edition of Apr. 1, 1998) of FDA (USA). Lupraphen 8104 has not to be marked according to the EC directive 67/548 and its guidelines. Lupraphen 8104 is supplied in road tankers and non-returnable drums. After supply the product may preferably be stored under appropriate conditions for at least six months. The storage temperature should preferably be as close as possible to the temperature at which the material will be processed. Short term warming or cooling of the product to low temperatures preferably does not damage the product. It should however be noted that at low temperatures viscosity increases markedly and this may cause difficulties in processing. Moist and wet conditions are to be avoided.

In a preferred embodiment Lupraphen 8103 comprises a difunctional, aliphatic polyester polyol. Lupraphen 8103 is preferably used for the production of compact and cellular polyurethane elastomers. It is particularly suitable for the production of shoe sole systems. Typical properties are listed in the following table:

| Appearance: | colourless to slightly yellow viscous liquid | |
| --- | --- | --- |
| OH Number | 56 mg KOH/g | DIN 53 240 |
| Viscosity at 75° C. | 525 mPa·s | DIN 53 015 |
| Water Content | ≤0.06% | DIN 51 777 |
| Acid Number | ≤0.8 mg KOH/g | DIN EN ISO 3682 |
| Density at 25° C. | 1.20 g/cm³ | DIN 51 757 |
| Colour | ≤75 Pt/Co, APHA | DIN ISO 6271 |
| Flash Point | >160° C. | DIN EN 22 719 |

Lupraphen 8103 is a polymer or no-longer-polymer, made from monomers, which are listed in the German consumer goods regulation, annex 3, paragraph A or B as well as in the directive 90/128/EG (Europe) and its amendments (latest: 96/11/EC), in annex II, paragraph A or B. The components of Lupraphen 8103 or its product groups or the polyurethanes made from Lupraphen 8103 are listed in the 21 CFR, part 175 105 (edition of Apr. 1, 1998) of FDA (USA). Lupraphen 8103 has not to be marked according to the EC directive 67/548 and its guidelines. Lupraphen 8103 is supplied in road tankers and non-returnable drums. After supply the product may be stored under appropriate conditions for at least six months. The storage temperature should be as close as possible to the temperature at which the material will be processed. Short term warming or cooling of the product to low temperatures does not damage the product. It should however be noted that at low temperatures viscosity increases markedly and this may cause difficulties in processing. Moist and wet conditions are to be avoided.

In a preferred embodiment Lupraphen 8101 comprises a difunctional, aliphatic, polyester polyol. Lupraphen 8101 is preferably used to improve the fire retardancy of rigid foams, especially of PIR formulations. Typical properties are listed in the following table:

| Appearance: | colourless to slightly yellow viscous liquid | |
| --- | --- | --- |
| OH Number | 55 mg KOH/g | DIN 53 240 |
| Viscosity at 75° C. | 625 mPa·s | DIN 53 015 |
| Water Content | ≤0.03% | DIN 51 777 |
| Acid Number | ≤0.9 mgKOH/g | DIN EN ISO 3682 |
| Density at 25° C. | 1.16 g/cm³ | DIN 51 757 |
| Colour | 50 Pt/Co, APHA | DIN ISO 6271 |
| Flash point | >160° C. | DIN EN 22 719 |

Lupraphen 8101 is a polymer or no-longer-polymer, made from monomers, which are listed in the German consumer goods regulation, annex 3, paragraph A or B as well as in the directive 90/128/EG (Europe) and its amendments (latest: 96/11/EC), in annex II, paragraph A or B. The components of Lupraphen 8101 or its product groups or the polyurethanes made from Lupraphen 8101 are listed in the 21 CFR, part 175 105 (edition of Apr. 1, 1998) of FDA (USA). Lupraphen 8101 is not classified as dangerous for supply according to the EC directive 67/548 and its amendments. Lupraphen 8101 is supplied in road tankers and non-returnable drums. After supply the product may be stored under appropriate conditions for at least six months. The storage temperature should be as close as possible to the temperature at which the material will be processed. Short term warming or cooling of the product to low temperatures does not damage the product. It should however be noted that at low temperatures viscosity increases markedly and this may cause difficulties in processing. Moist and wet conditions are to be avoided.

In a preferred embodiment Lupraphen 8008 comprises a difunctional polyester polyol. It is based on aromatic dicarboxylic acids. Lupraphen 8008 is preferably used to improve the fire performance of rigid foams. It has been developed for the production of block foams and for the manufacture of rigid foam panels with flexible facings. It is especially recommended for the manufacture of PIR foams. Typical properties are listed in the following table:

| Appearance: | colourless to pale yellow viscous liquid | |
| --- | --- | --- |
| OH Number | 238 mg KOH/g | DIN 53 240 |
| Viscosity at 25° C. | 3300 mPa·s | DIN 53 015 |
| Water Content | ≤0.1% | DIN 51 777 |
| Density at 25° C. | 1.23 g/cm³ | DIN 51 757 |
| Flash point | >160° C. | DIN EN 22 719 |

Lupraphen 8008 is a polymer or no-longer-polymer, made from monomers, which are listed in the German consumer goods regulation, annex 3, paragraph A or B as well as in the directive 90/128/EG (Europe) and its amendments (latest: 96/11/EC), in annexe II, paragraph A or B. The components of Lupraphen 8008 or its product groups or the polyurethanes made from Lupraphen 8008 are listed in the 21 CFR, part 175 105 (edition of Apr. 1, 1998) of FDA (USA). Lupraphen 8008 is not classified as dangerous for supply according to the EC directive 67/548 and its amendments. Lupraphen 8008 is supplied in road tankers and non-returnable drums. After supply the product may preferably be stored under appropriate conditions for at least six months. The storage temperature should preferably be as close as possible to the temperature at which the material will be processed. Short term warming or cooling of the product to low temperatures preferably does not damage the product. It should however be noted that at low temperatures viscosity increases markedly and this may cause difficulties in processing. Moist and wet conditions are to be avoided.

In a preferred embodiment Lupraphen 8007 comprises a difunctional polyester polyol based on aromatic dicarbonic acids. Lupraphen 8007 is preferably used to improve the fire retardancy of rigid foams, especially of PIR formulations. Typical properties are listed in the following table:

| Appearance: | colourless to slightly yellow, viscous liquid | |
|---|---|---|
| OH Number | 240 mg KOH/g | DIN 53 240 |
| Viscosity at 25° C. | 12 500 mPa·s | DIN 53 015 |
| Viscosity at 75° C. | 175 mPa·s | DIN 53 015 |
| Water Content | ≤0.07% | DIN 51 777 |
| Acid Number | ≤1.8 mg KOH/g | DIN EN ISO 2114 |
| Density at 25° C. | 1.2 g/cm$^3$ | DIN 51 757 |
| Colour | ≤2 iodine | DIN 6162 |
| Flash point | >160° C. | DIN EN 22 719 |

Lupraphen 8007 is a polymer or no-longer-polymer, made from monomers and additives, which are listed in the directive 90/128/EG (Europe) and its amendments (latest: 2004/19/EG), in annex II, paragraph A or B or annex III, paragraph A or B. The components of Lupraphen 8007 or its product groups or the polyurethanes made from Lupraphen 8007 are listed in the 21 CFR, part 175 105 (edition of Apr. 1, 1998) of FDA (USA). Lupraphen 8007 has not to be marked according to the EC directive 67/548 and its guidelines. Lupraphen 8007 is supplied in road tankers and non-returnable drums. After supply the product may preferably be stored under appropriate conditions for at least six months. The storage temperature should preferably be as close as possible to the temperature at which the material will be processed. Short term warming or cooling of the product to low temperatures preferably does not damage the product. It should however be noted that at low temperatures viscosity increases markedly and this may cause difficulties in processing. Moist and wet conditions are to be avoided.

In a preferred embodiment Lupraphen 8004 comprises a branched, aromatic-aliphatic polyester polyol. Lupraphen 8004 is preferably used for the production of polyurethane rigid foam systems. Typical properties are listed in the following table:

| Appearance: | colourless to slightly yellow solid | |
|---|---|---|
| OH Number | 383 mg KOH/g | DIN 53 240 |
| Viscosity at 75° C. | 1363 mPa·s | DIN 53 015 |
| Water Content | ≤0.08% | DIN 51 777 |
| Acid Number | ≤1.2 mg KOH/g | DIN EN ISO 3682 |
| Density at 25° C. | 1.11 g/cm$^3$ | DIN 51 757 |
| Colour | ≤10 iodine | DIN 6162 |
| Flash point | >160° C. | DIN EN 22 719 |

Lupraphen 8004 is a polymer or no-longer-polymer, made from monomers, which are listed in the German consumer goods regulation, annex 3, paragraph A or B as well as in the directive 90/128/EG (Europe) and its amendments (latest: 96/11/EC), in annex II, paragraph A or B. The components of Lupraphen 8004 or its product groups or the polyurethanes made from Lupraphen 8004 are listed in the 21st CFR, part 175 105 (edition of Apr. 1, 1998) of FDA (USA). Lupraphen 8004 has not to be marked according to the EC directive 67/548 and its guidelines. Lupraphen 8004 is supplied in road tankers and non-returnable drums. After supply the product may preferably be stored under appropriate conditions for at least six months. The storage temperature should preferably be as close as possible to the temperature at which the material will be processed. Short term warming or cooling of the product to low temperatures preferably does not damage the product. It should however be noted that at low temperatures viscosity increases markedly and this may cause difficulties in processing. Moist and wet conditions are to be avoided.

Polycarbonate (PC)

Polycarbonates relate to polymers containing carbonate groups (—O—(C=O)—O—). Most polycarbonates of commercial interest are derived from rigid monomers, which due to their final structure are very durable materials. Although it has high impact-resistance, it has low scratch-resistance and unlike most thermoplastics, polycarbonate can undergo large plastic deformations without cracking or breaking. A balance of useful features including temperature resistance, impact resistance and optical properties position polycarbonates between commodity plastics and engineering plastics.

Preferred PC components are:

Makrolon 2400

Makrolon 2405

Makrolon 2800

Makrolon 2805

Polycaprolactone (PCL)

Polycaprolactone (PCL) is biodegradable polyester with a low melting point of around 60° C. and a glass transition temperature of about −60° C. The most common use of polycaprolactone is in the manufacture of speciality polyurethanes. Polycaprolactones impart good water, oil, solvent and chlorine resistance to synthetic materials.

Preferred PCL components are:

Perstorp Capa 6400

Perstorp Capa 6500

Perstorp Capa 6800

Extrusion

Preferably, either single, twin or multiple screw extrusion is used as method for mixing, compounding, or reacting polymeric materials in the present invention. The flexibility of twin screw extrusion equipment allows this operation to be designed specifically for the formulation being processed. For example, the two screws may be corotating or counterrotating, intermeshing or nonintermeshing. In addition, the configurations of the screws themselves may be varied using forward conveying elements, reverse conveying elements, kneading blocks, and other designs in order to achieve particular mixing characteristics. Alternatively, single screw configurations may be modified to enable different strengths or degrees of in homogenisation, for example by changing the structure of the screw in any given screw segment.

According to the present invention, extrusion comprises a process to create objects of a fixed, cross-sectional profile. The material is pushed or drawn through a die of the desired cross-section. The two main advantages of this process over other manufacturing processes are its ability to create very complex cross-sections and work materials that are brittle, because the material only encounters compressive and shear stresses. It also forms finished parts with an excellent surface finish. Extrusion may be continuous or semi-continuous. The process begins by heating the stock material (for hot or warm extrusion). Hot extrusion is a hot working process, which means it is done above the material's recrystallization temperature to keep the material from work hardening and to make it easier to push the material through the die.

Extruder

Preferred extruders of the invention are:
1. Coperion ZSK 32 MC Extruder
(Coperion GmbH)
Twin Screw Extruder
   screw diameter: 32 mm
   screw length: 48 D
   through put: 10 bis 200 kg/h
2. Leistritz Extruder Micro 27-36D
(LEISTRITZ EXTRUSIONSTECHNIK GMBH)
Twin Screw Extruder
   screw diameter: 27 mm
   through put: 3-30 kg/h
   screw length (2): 36 D
3. Granulator Pell-tec SP 50 EN
(PELL-TEC Pelletizing Technology GmbH)
Strand granulator for up to 8 strands
Strand velocity: 15-60 m/min
Granulate length between 2-15 mm
4. Gala LPU
(Gala Kunststoff-und Kautschukmaschinen GmbH)
Below water granulation
Granulation energy consumption: 2 to 150 kg/h
5. Melt equipment Concept B/12/1 Premelter KPC 12
(Robatech GmbH)
Hot melt pump for feeding the polyols
6. Brabender DDW MD-FW40N/5plus-50
(Brabender Technologie KG)
Gravimetric dosing balance
with operation unit Congrav OP 5—Touch
7. Brabender DDW MD2-DDSR 20-10Q
(Brabender Technologie KG)
Gravimetric dosing balance
with operation unit Congrav OP 5—Touch
8. In-House Single Screw Extruder
(similar to Buss-Ko-Kneter)

The extruder is a 44D extruder, meaning 44×53=2.33 m. There are 11 temperature zones along the extruder, and 8 in the die, sieve and neck. Every temperature zone is 212 mm (21.2 com). The screw is 53 mm, co-rotating, 3 lobs, 44D.
9. Foaming Equipment
(KraussMaffei Berstorff Schaumtandex-Anlage ZE 30/KE 60)
   Through put: approx. 20 to 50 kg/h
   Gravimetric dosing
   Twin screw extruder ZE 30 A×30 D UTX
   Single screw extruder KE 60×30 D
   Temperature unit for liquids
   Dosing unit for foaming agent
   Profile header nozzle gap: 0.5 to 2 mm×100 mm for foamed boards up to 300 mm width and 60 mm thickness
   Board calibrator
   Roll haul off Further Preferred Embodiments The incorporation of nanoclays into the TPU composites of the present invention enables a novel polymerization and/or adhesion and therefore a reduction of process steps in the production of such synthetic materials.

The present method can also use recycled TPUs as starting materials of the present invention. The method can be used for recycling polymers or recycled plastics (synonym use). In the preferred embodiment the mineral or organic nanocomposites the polymer contains between 0 to 99% of the virgin polymer and between 1 to 100% of a recycling polymer, which consists in the range of 0 to 100%.

Preferably the polymer melt contains less than 10% weight % as nanoclay before formation of the disclosed nanocomposite. The polymer melt, polymerization before formation of the disclosed nanocomposite contains preferably less than 2%, more preferably less than 1%, even more preferably less than 0.5% as a nanoclay.

The applicable nanoclays can be intercalated with organic molecules (e.g. ammonia ions) between the proximate layers. The incorporation of polymers between the layers with a minimum of 3 A, preferably 5 A and for the interim layer (interlaminar) with a distance of approximately 10-15 A and up to 100 A, is performed for example via mixing and higher shear. Clays possess the property of flaking. The amount of the mixture, mixed with the recycling-polymer can vary. Clay loadings are in the range of approximately 0.01 to 40% weight %, preferably approximately 0.05 to 20%, more preferably 0.5 to 15% and most preferably 1 to 10% of the total composition. It is preferred that the clay contains less than 15% of the nanocomposite.

An additional aspect of the described process is the form stability (peeling) of the clays which are mechanically and chemically split. For gaining the full advantage out of the process and composition the clays are finely dispersed and are in fact nanoclays. The used nanocomposites refer to a mixture out of recycled polymer and a clay which is in minimum partly flaked off. The nanocomposites can also be used as new material. The type of mixture of the polymer melt and the clay can comprise compounding, extrusion, mixing or every other method for bringing polymer and resins together with in minimum partly individual platelets.

A recycling polymer is a polymer material which is implemented after a certain period of use. The application can be intended for the casting formation of polymers and products or the application of a dedicated purpose. Two different types of recycling polymers exist: post-industrial and post-consumer. In general post-industrial recycling polymers are these polymer-materials which derive from an industrial manufacturing process. Usually post-industrial recycling polymers do not get contaminated with other materials or polymers.

Recycled polymers can be used for new material, especially when use for superior physical properties. Furthermore, the described recycled polymer-nanocomposites show retention properties so that the physical properties remain without significant disadvantageous effect on the recycling via additional steps in comparison to polymers which are improved without nanoclays.

Due to the nano technology described herein it is possible to produce polymers via essentially HFCKW (comprises CFC—chloroflurocarbon) free processes.

The synthetic materials comprising 47.784% TPU, 12.0% Polyol, 0.216% Nanoclay, 28% PC and 12% PCL, in addition to the materials comprising 47.946% TPU, 12.0% Polyol, 0.054% Nanoclay, 28% PC and 12% PCL are suitable for longer storage. The substance shows surprisingly low tendency for degradation. In particular the handling process is enhanced. Surprisingly these substances are less irritant, inert, easier to process and show stronger mechanical properties than conventional synthetic materials.

The polymers of the present invention exhibit the following advantages:
  Non-poisonous
  Lighter than known materials
  Reduction in production and material costs
  Simpler production processes
  Emission avoidance
  Low hydrolysis hazards
  Simple to store and transport The following disadvantages of those materials known in the art are avoided:
  contamination of drinking water
  danger to health of end-users (avoidance of potential cancer risk)
  contamination of foodstuffs via packaging materials
  agricultural damage due to toxic substances in soil.

Further advantages of the subject matter of the invention relate to:
  The material resists temperature change processes with daily variation.
  Permanent temperature resistance.
  Maximal short term temperature resistance is +250° C.

Fire behaviour:
  according to DIN 4102: part 1—construction material class B2
  according to DIN 4107, part 7—resistant and against flying sparks and heat radiation, which is applicable for flat roof coatings.

Technical characteristics of the preferred embodiments of the synthetic material of the present invention may further be, or be determined by:

| | |
|---|---|
| Density | Approximately 1.000 to 1.200 kg/m³ |
| Humidity | absorbs no humidity |
| Changement of measurement values after thermal storage | none |
| Tension properties | better then Thermoplast/PE |
| Elastic tension properties | better then Thermoplast/PE |
| Elastic stretch properties | better then Thermoplast/PE |
| Tension resistance | better then Thermoplast/PE |
| Soot content | none with PU-basis |
| Soot distribution | none with PU-basis |
| Permanent temperature resistance | −40 to +100 C. |
| Max. shorttime thermal load | +250° C. |
| Rupture restistance | over 700% |
| Chemical resistance | resistant against aggressive chemicals |
| Further chemical resistance | solvents, softners, mineral oils, alkalis, fuels, emissions |
| Biological resistance | fungus, microbs, roots groth, deterioration, putrefaction |
| Further biological resistance | acc. to DIN 53930-31 and DIN 4062 |
| Mechanical resistance | improved |
| Environmental impact | none |
| Humidity behavior | conform DIN 4108 |
| Vapour diffusion resistance factor | Q 50 acc. DIN 52615 |
| UV-resistance | no influence from UV |
| Strenght of root | acc. DIN 4062 |
| Processing advantage | seamless |
| Ground water risks | none as there is no embrittlement of material due to PUR-basis |
| DIN | 4108 |
| DIN | 53421 |
| DIN | 52615 |
| DIN | 4062 |
| DIN | 53930-31 |
| Fire behavior | B2 acc. DIN 4102 |
| Flying sparks | acc. DIN 4107, part 7 |

Material measurements for a thermoplastic urethane (TPU) compound:

The material is characterized with measurement of the following key parameters:

P-V-T measurement: the specific volume is determined in dependence of pressure and temperature. Therefore typical equipment types are commercially available. The measurements are conducted at isobar cooling and constant cooling velocity of $v_{(cooling)}=6$ K/min in a pressure range of 1 bar to 1000 bar and a temperature range of 40° C. to 240° C. The results fit with the approach of Menges.

Specific heat capacity is determined in dependence of the temperature. Measurements are conducted with DCS (Differential-Scanning-Calorimetry). The thermogram can be calculated according to ISO 11357-4. Typical DSC equipments are commercially available. The specific heat capacity was calculated for a temperature range of 40° C. to 300° C.

Viscosity measurement: the viscosity curves can be generated with a rotation/oscillation rheometer at 180° C., 200° C., 220° C. The measurements are conducted in a dynamic mode in the frequency range of 0.1 rad/s to 100 rad/s with a cone/plate arrangement according to ISO 6721. The tooling has a diameter of 25 mm. With dynamic viscosity measurements the complex viscosity is measured in dependence of the circle frequency at a constant temperature and at a constant deformation degree (deflection angle of the oscillating plate). Before conducting the measurement the TPU samples are dried for 8 hours in a vacuum dryer at 80° C. The results were calculated based on the assumption of wall adherence. For the measured curves the Arrhenius equation and the Carreau approach was taken into account.

The modified thermoplastic polyurethanes (TPU) of the invention show the following properties: excellent material properties (vapour porosity, heat conductance, melting point), nano-absorber properties, flexible adaption for dedicated purpose, low material costs (100% lower than PTFE), processing with existing/available production lines without expensive new installations. The foils can be manufactured with environment friendly processes like blowing extrusion and it is possibility to produce TPU foils in different types: 3, 4, 5, 6, 7, 8, 9; 12 my foils. TPU foils can be imprinted. Polyurethane foils can be breathable, show environment endurance, are not skin irritating, and are permeable for water vapour. The foils are resistant against microbes, fungus, UV radiation, yellowing, hydrolysis, enzymes, high humidity, chemicals, oils, fats, week acids, carbon acid, alkali, carbon oils, alcohols.

FIGURES

The figures provided herein represent examples of particular embodiments of the invention and are not intended to limit the scope of the invention. The figures are to be considered as providing a further description of possible and potentially preferred embodiments that enhance the technical support of one or more non-limiting embodiments.

Short Description of the Figures

Figure 2:
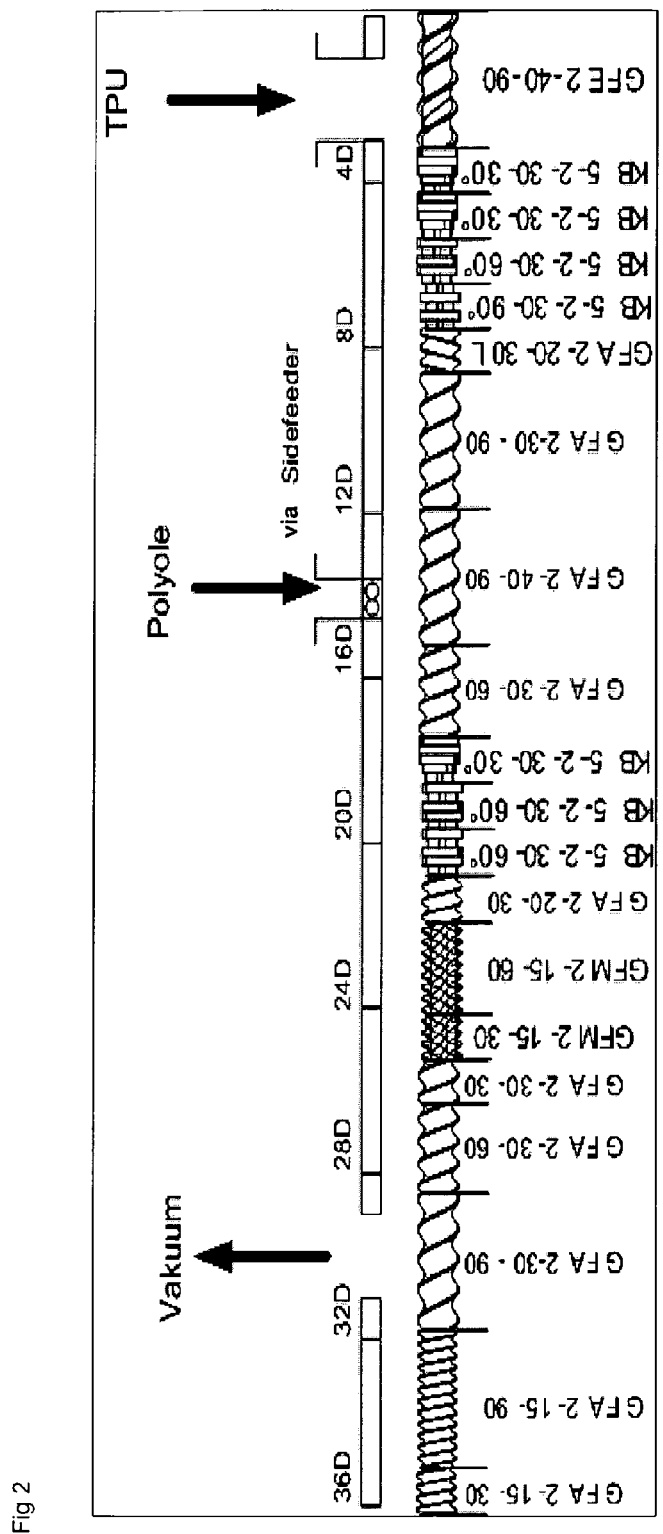
Figure 3:
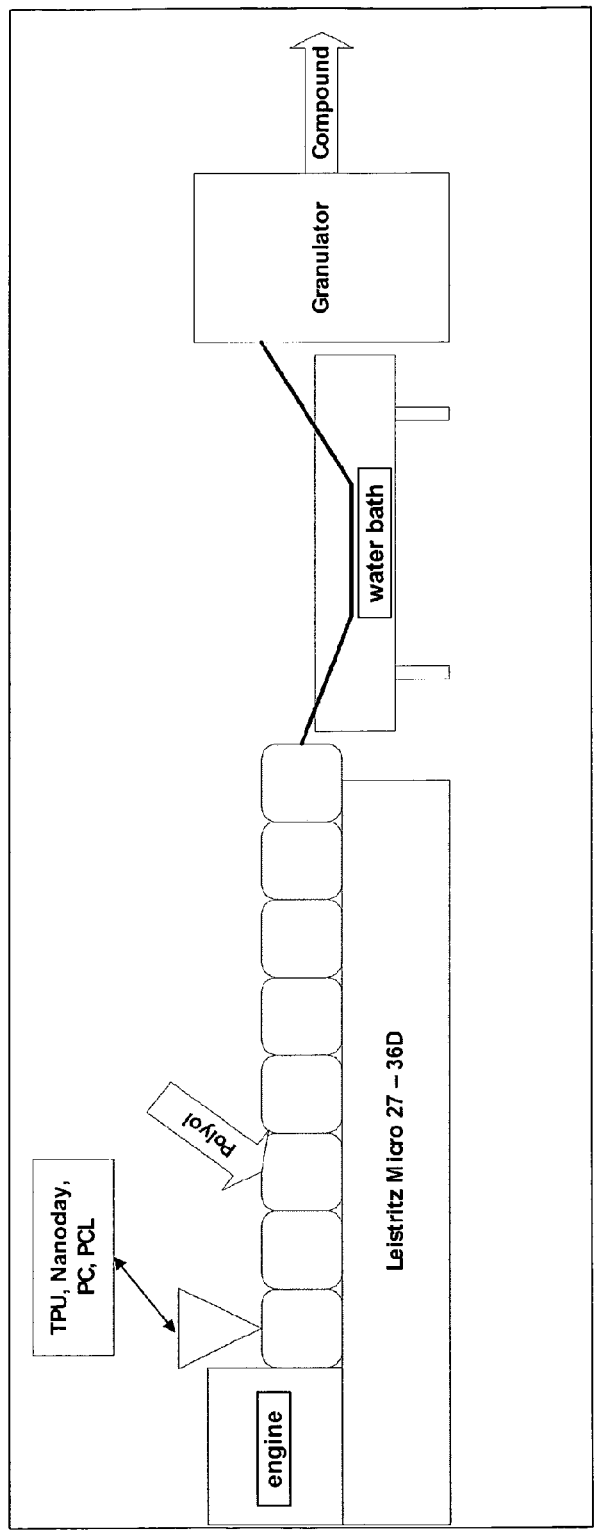
Figure 4:
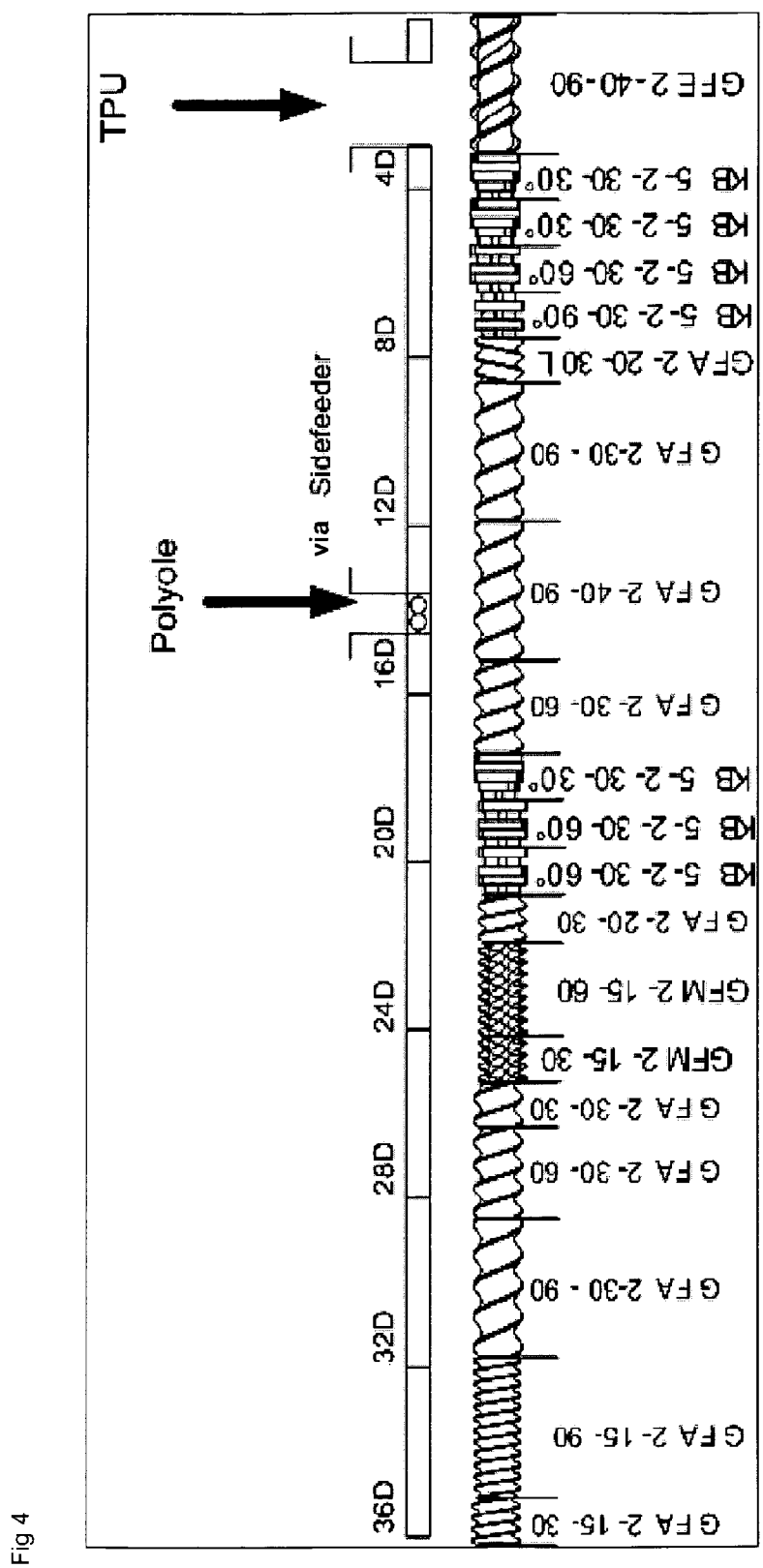
Figure 5:
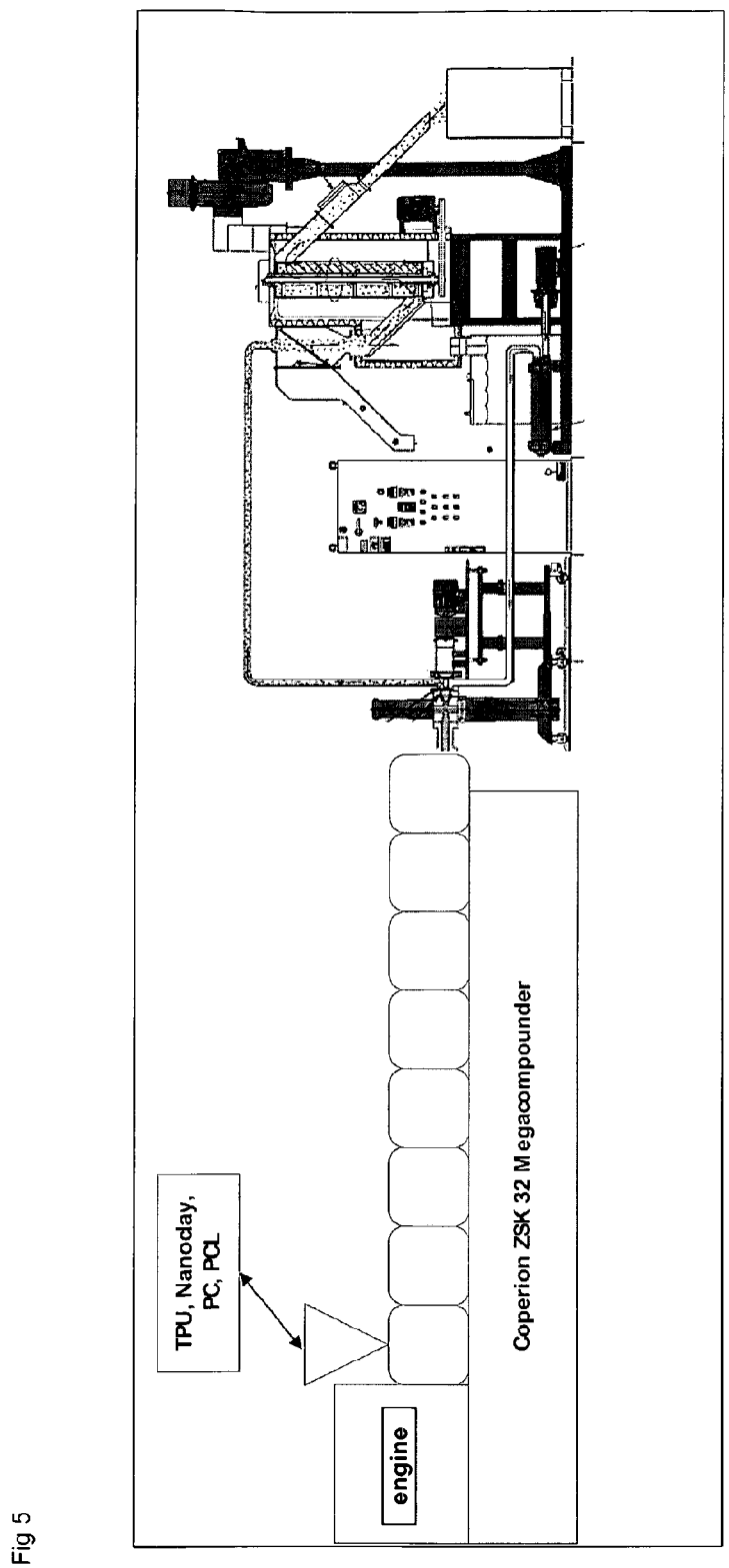
Figure 6:
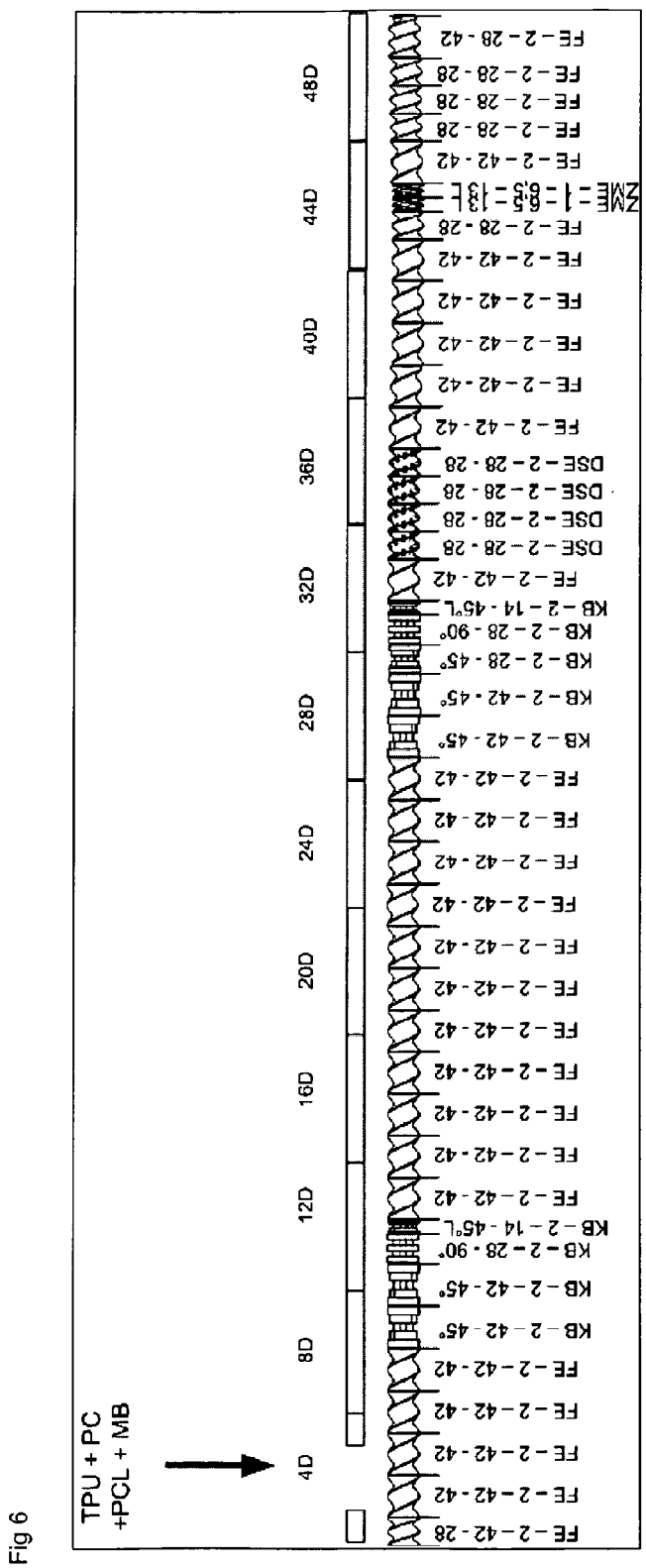
Figure 7:
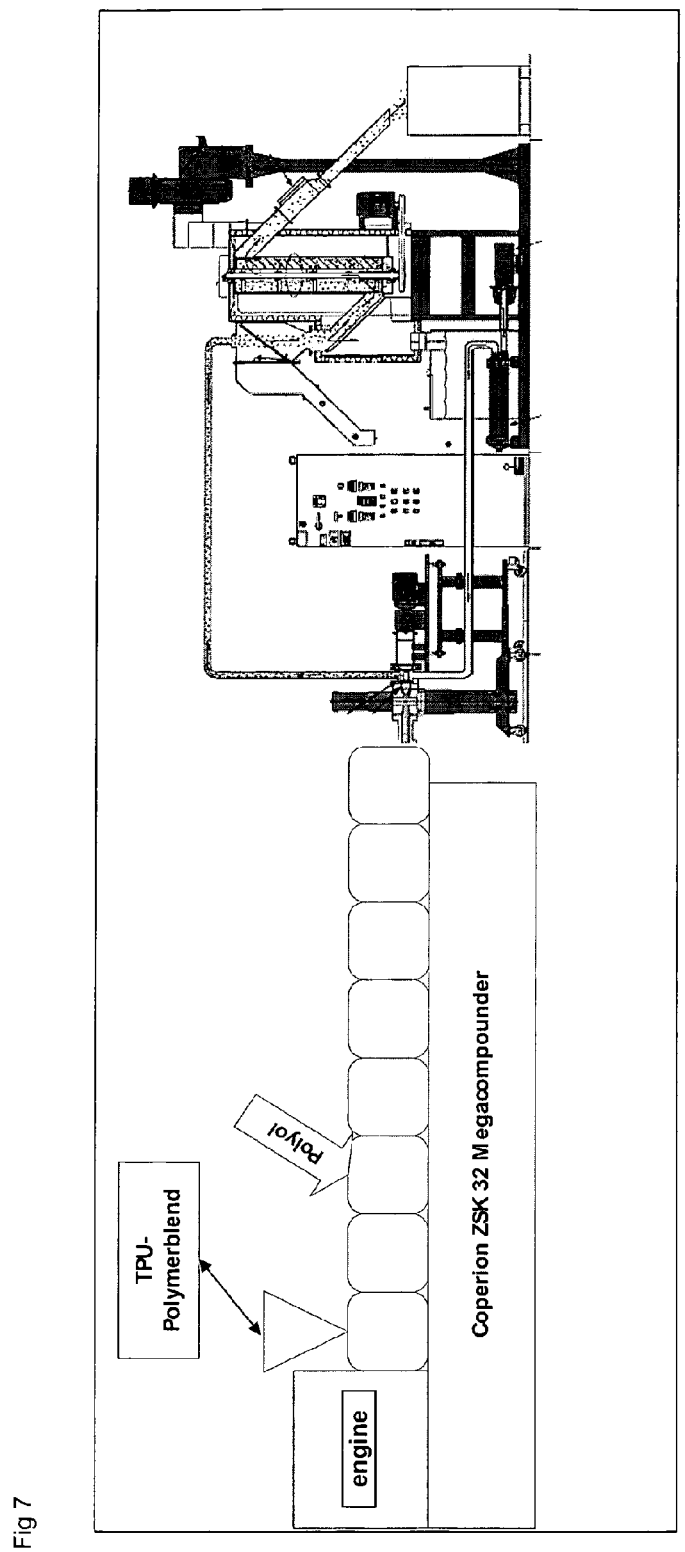
Figure 8:
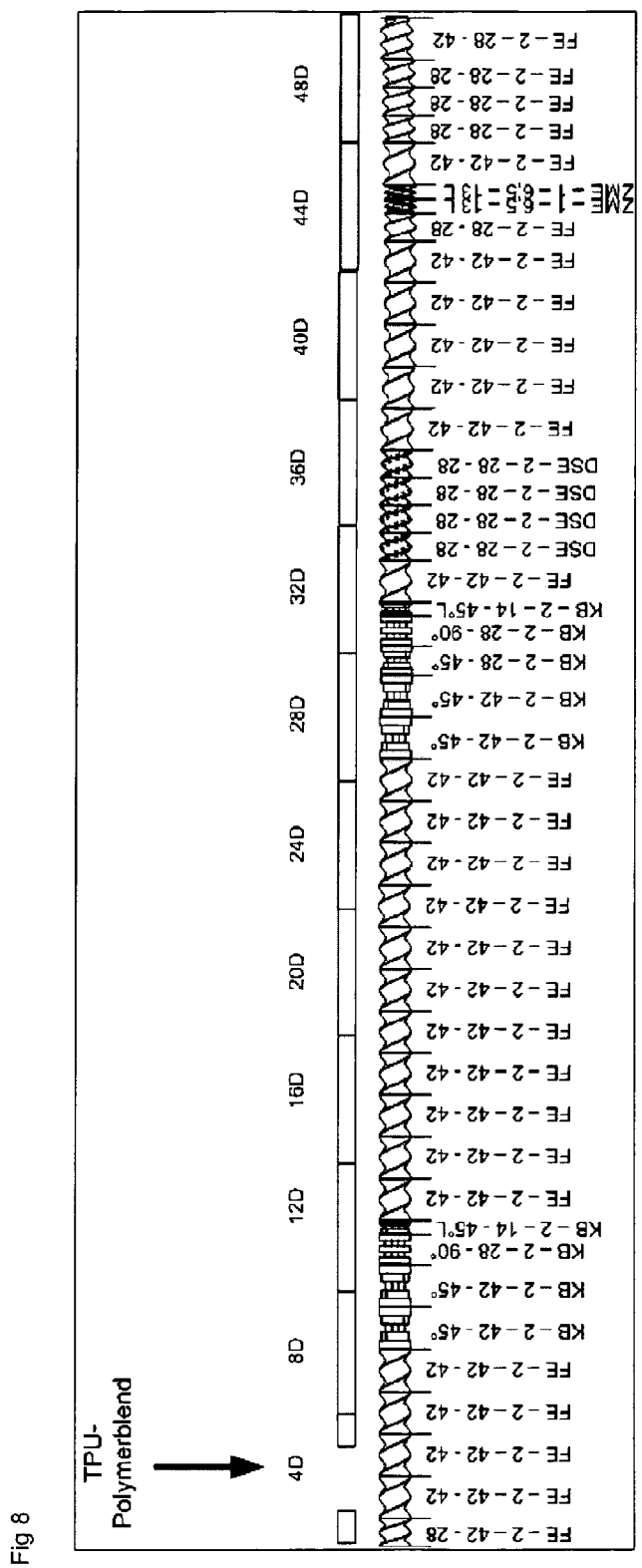
Figure 9:
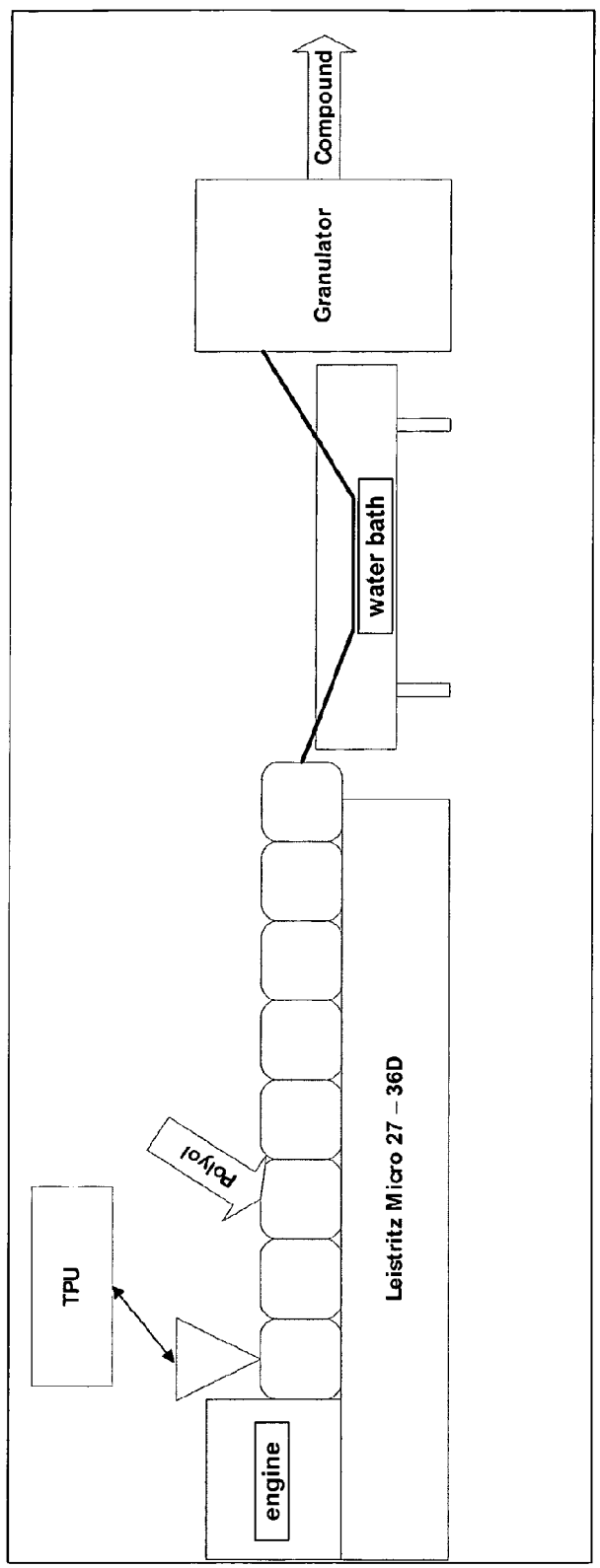
Figure 10:
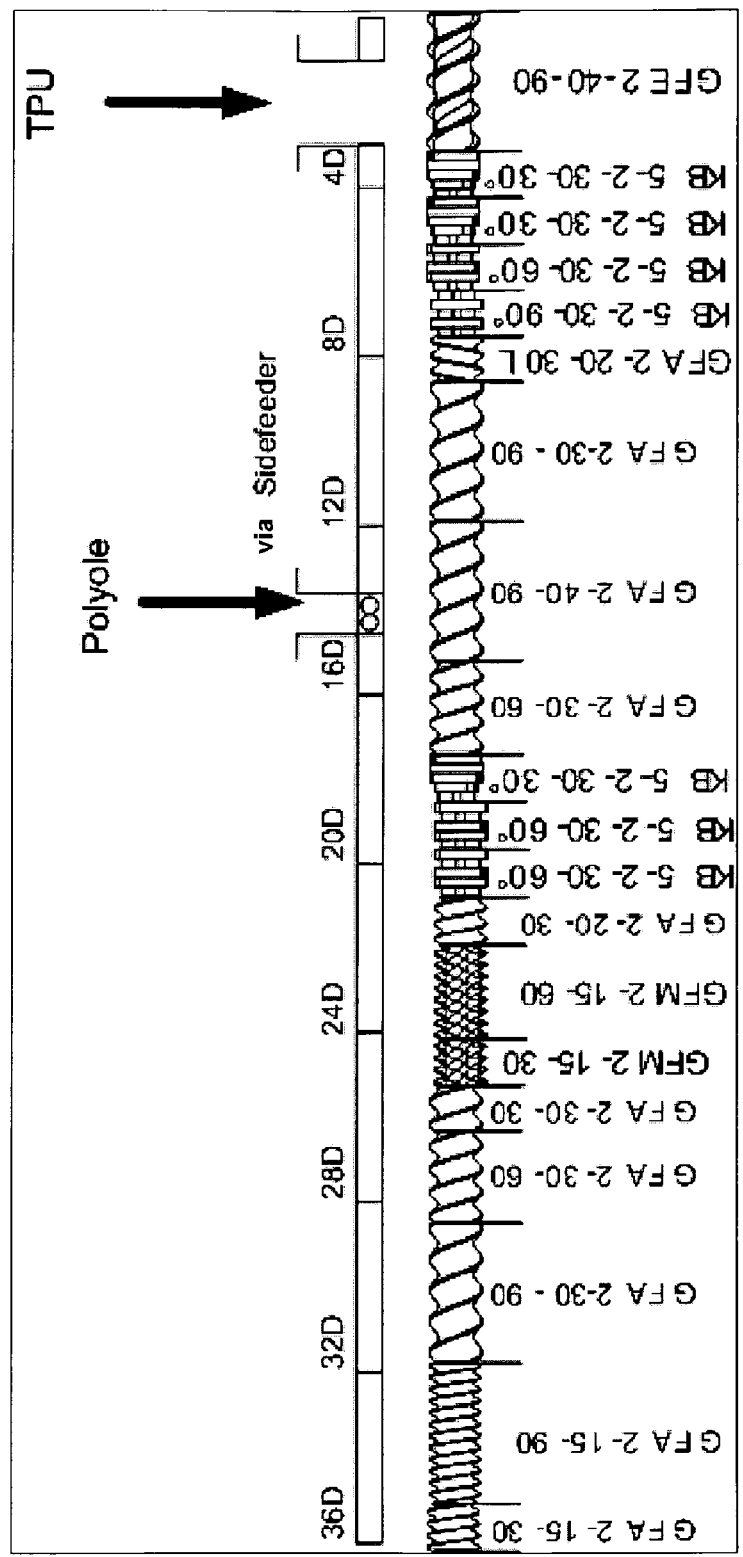
Figure 11:
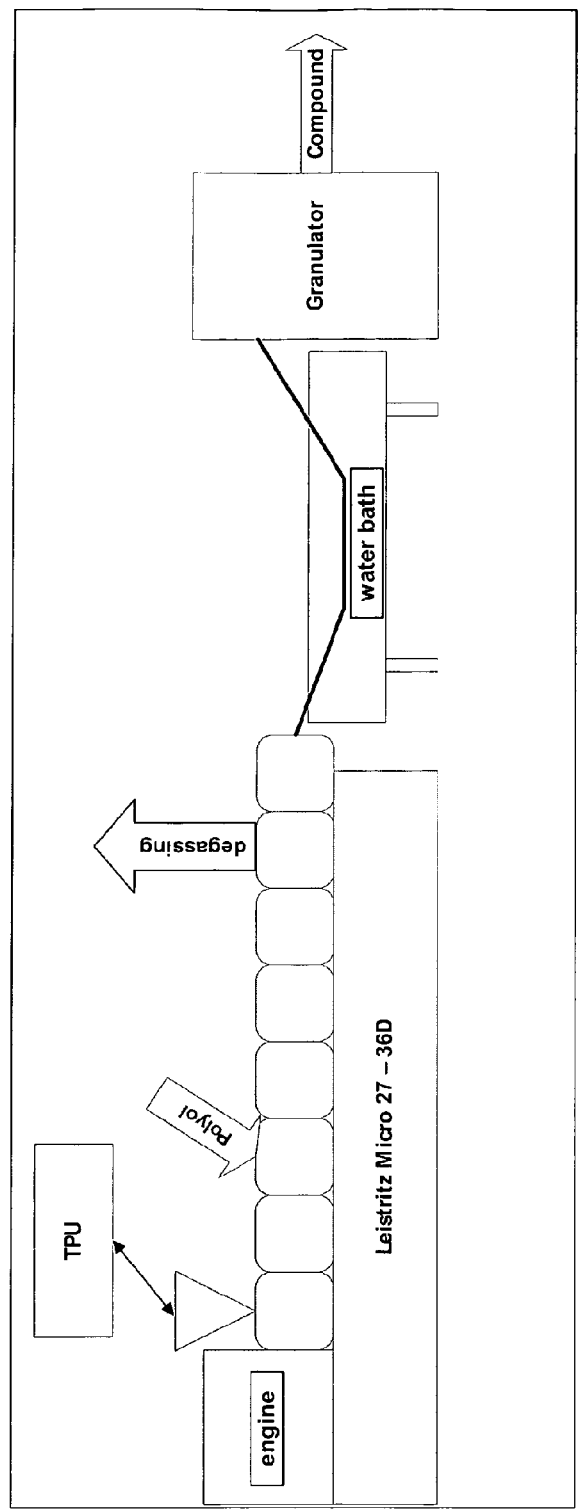
Figure 12:
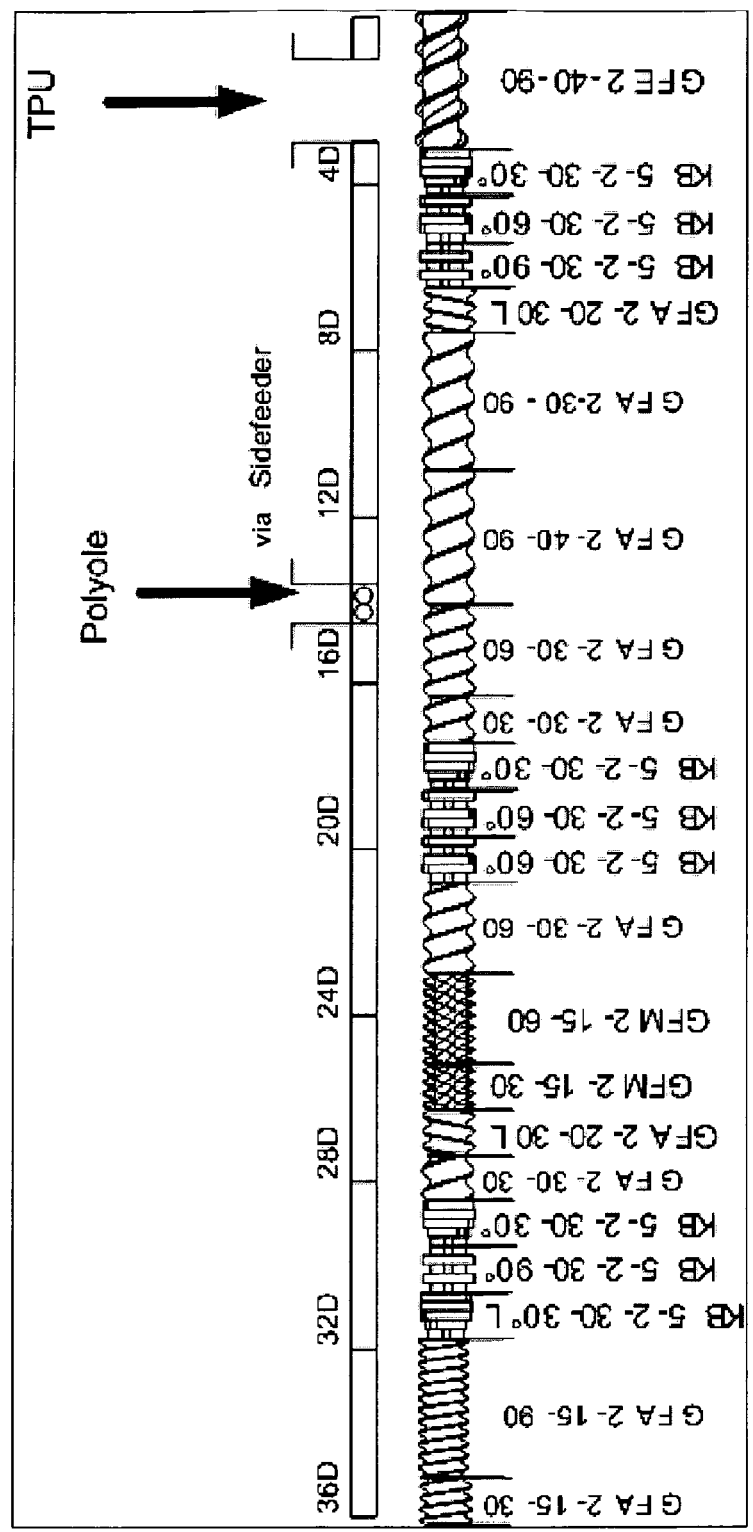
Figure 13:
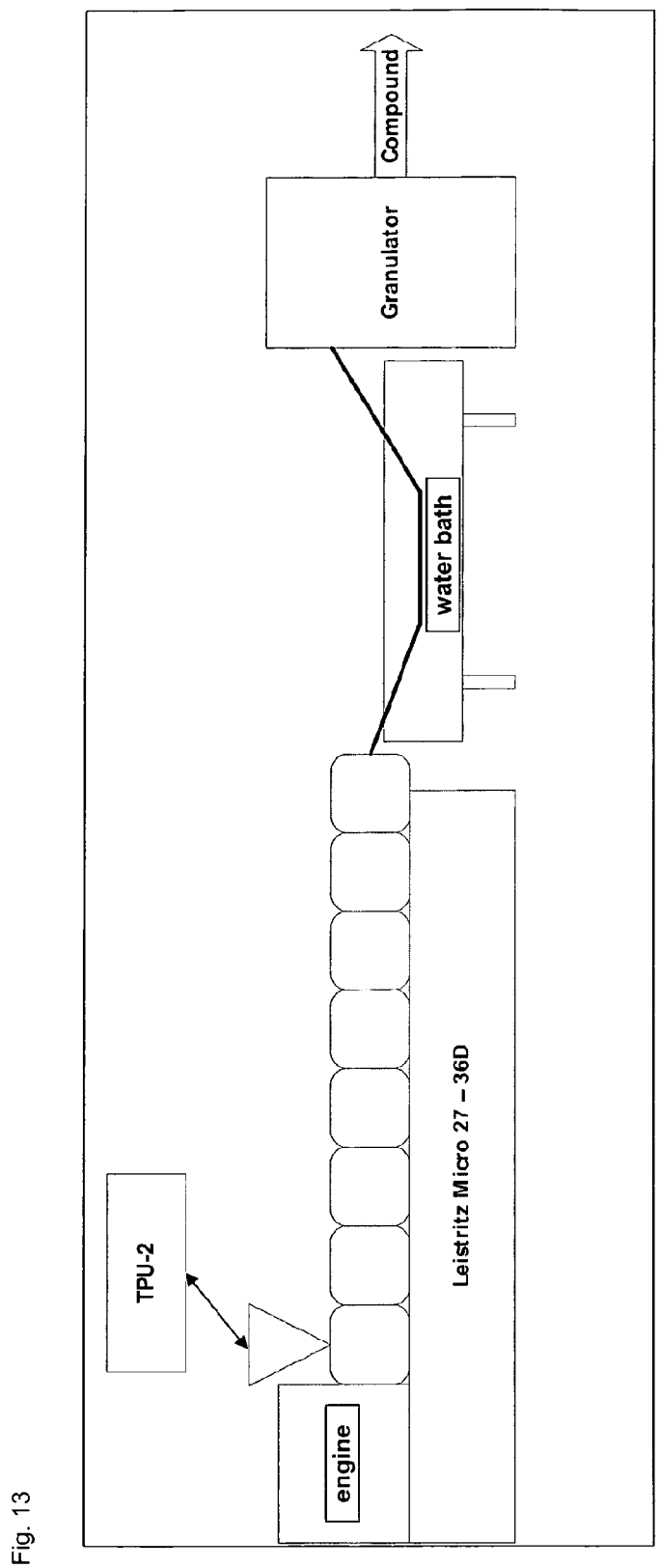
Figure 14:
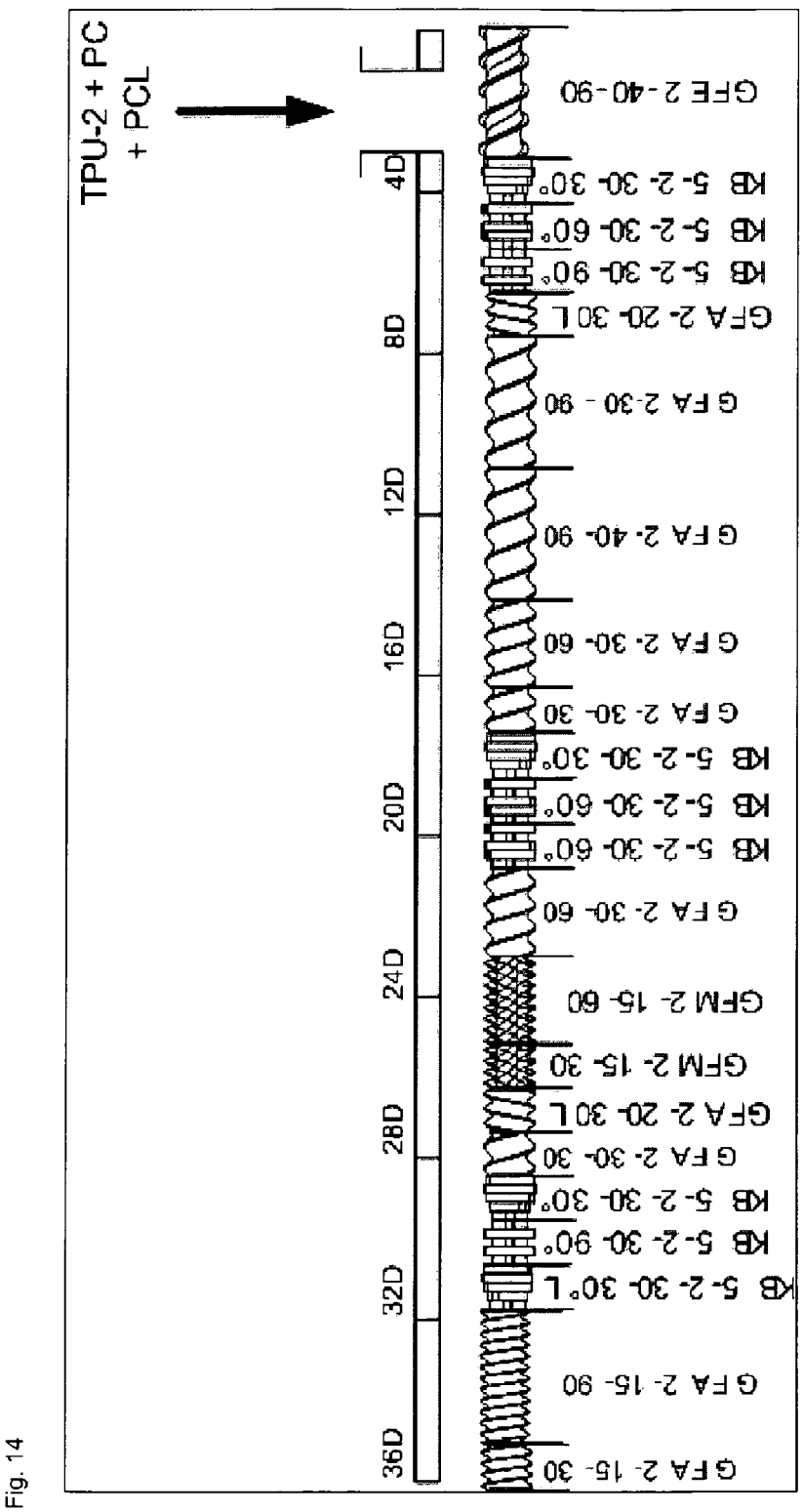
Figure 15:
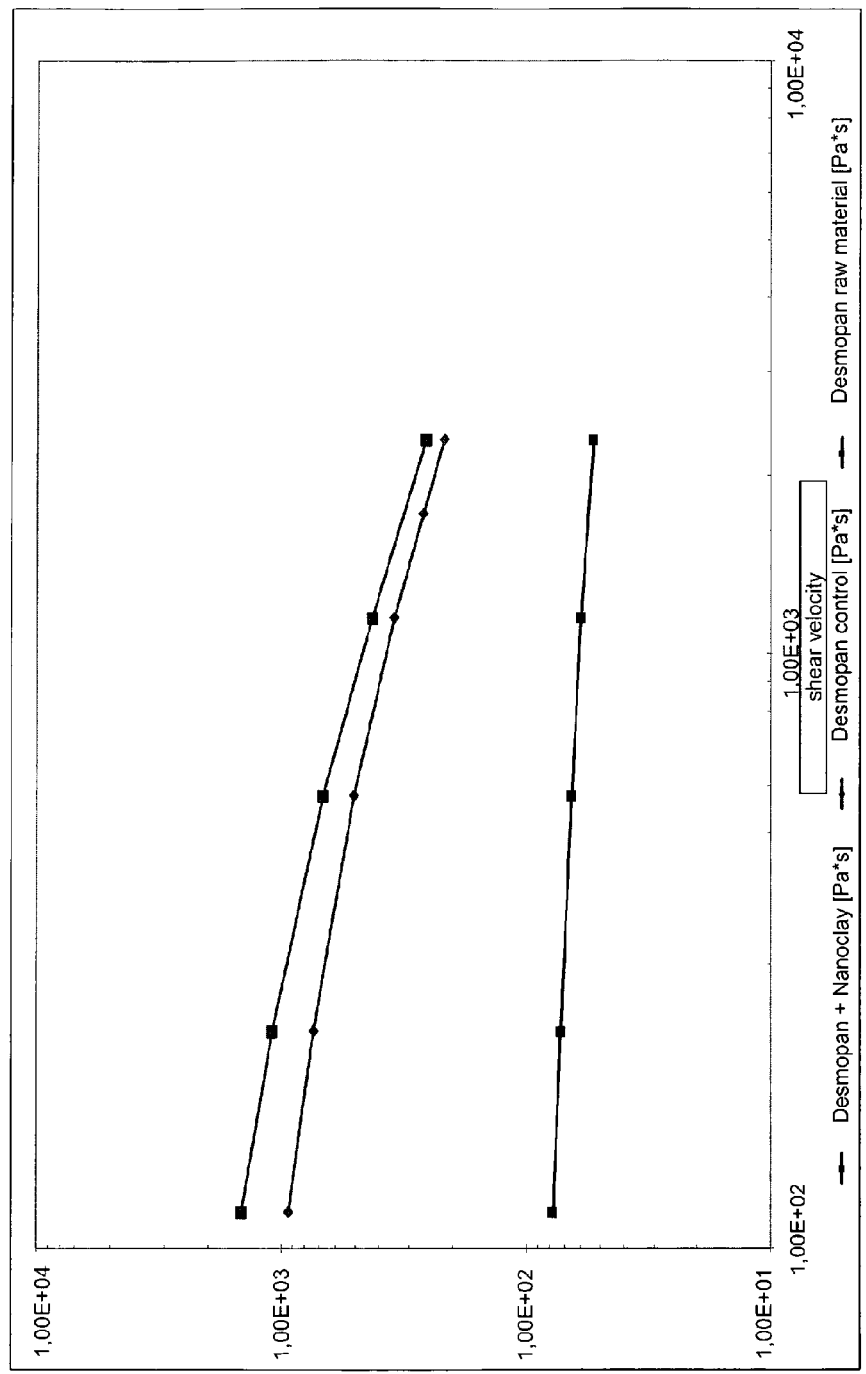
Figure 16:
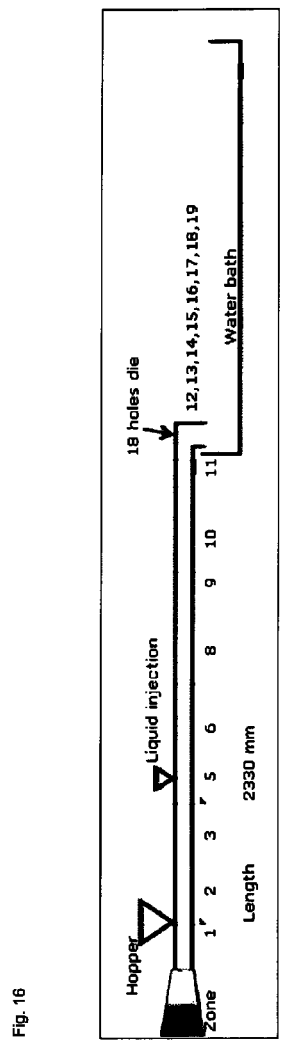
Figure 17:
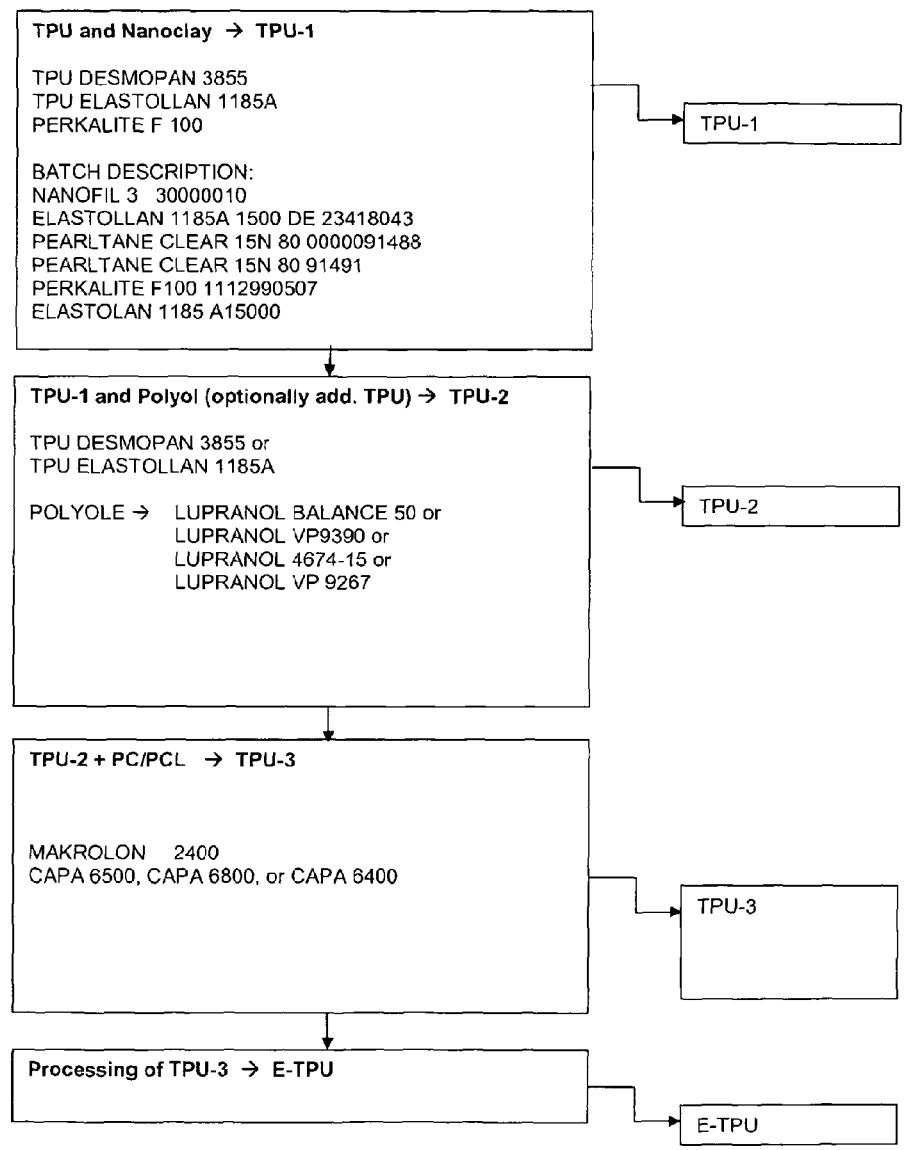

FIG. 1 Schematic representation of an extruder
FIG. 2 Schematic representation of a screw configuration
FIG. 3 Schematic representation of an extruder
FIG. 4 Schematic representation of a screw configuration
FIG. 5 Schematic representation of an extruder
FIG. 6 Schematic representation of a screw configuration
FIG. 7 Schematic representation of an extruder
FIG. 8 Schematic representation of a screw configuration
FIG. 9 Schematic representation of an extruder
FIG. 10 Schematic representation of a screw configuration
FIG. 11 Schematic representation of an extruder
FIG. 12 Schematic representation of a screw configuration
FIG. 13 Schematic representation of an extruder
FIG. 14 Schematic representation of a screw configuration
FIG. 15 Viscosity diagram
FIG. 16 Schematic representation of an extruder
FIG. 17 Schematic representation of the method FIG. 1 shows a schematic representation of a twin screw extruder for example a Leistritz Micro 27-36 D which is used for carrying out the experiments in example 1. In FIG. 1 for example a vent port is installed for degassing purpose of for example volatile material and equipping a vacuum installation unit. FIG. 2 shows a schematic representation of a screw configuration used for example 1. It can be seen that screw is equipped with different feeding elements, mixing elements (GFM) and kneading blocks (KB). FIG. 3 shows a schematic representation of a twin screw extruder for example a Leistritz Micro 27-36 D which is used for carrying out the experiments in example 2. FIG. 4 shows a schematic representation of a screw configuration used for example 2. It can be seen that screw is equipped with different feeding elements, mixing elements (GFM) and kneading blocks (KB). FIG. 5 shows a schematic representation of a twin screw extruder for example a Coperion ZSK 32 Megacompounder which is used for carrying out the experiments in example 3. FIG. 6 shows a schematic representation of a screw configuration used for example 3. It can be seen that screw is equipped with different feeding elements, mixing elements and kneading blocks. FIG. 7 shows a schematic representation of a twin screw extruder for example a Coperion ZSK 32 Megacompounder which is used for carrying out the experiments in example 4. FIG. 8 shows a schematic representation of a screw configuration used for example 4. It can be seen that screw is equipped with different feeding elements, mixing elements and kneading blocks. FIG. 9 shows a schematic representation of a twin screw extruder for example a Leistritz Micro 27-36 D which is used for carrying out the experiments in example 6. FIG. 10 shows a schematic representation of a screw configuration used for example 6. It can be seen that screw is equipped with different feeding elements, mixing elements (GFM) and kneading blocks (KB). FIG. 11 shows a schematic representation of a twin screw extruder for example a Leistritz Micro 27-36 D which is used for carrying out the experiments in example 7. In FIG. 11 for example a vent port is installed for degassing purpose of for example volatile material and equipping a vacuum installation unit. FIG. 12 shows a schematic representation of a screw configuration used for example 7. It can be seen that screw is equipped with different feeding elements, mixing elements (GFM) and kneading blocks (KB). FIG. 13 shows a schematic representation of a twin screw extruder for example a Leistritz Micro 27-36 D which is used for carrying out the experiments in example 9. FIG. 14 shows a schematic representation of a screw configuration used for example 9. It can be seen that screw is equipped with different feeding elements, mixing elements (GFM) and kneading blocks (KB). FIG. 15 shows the viscosity curves of three different examples with desmopan and the effect of nanoclay observed in example 5. FIG. 16 shows a schematic representation of a twin screw extruder which is in particular used for carrying out the experiments in example 8.

EXAMPLES

The examples provided herein represent practical support for particular embodiments of the invention and are not intended to limit the scope of the invention. The examples are to be considered as providing a further description of possible and potentially preferred embodiments that demonstrate the relevant technical working of one or more non-limiting embodiments.

Example 1

TPU, TPU/TPU/Nanoclay and
Polyol-Leistritz-Extruder

This experiment described the mixture of nanoclays and TPU according to the first key step of the process.

| No. | wt.-% | TPU | wt.-% | Masterbatch | wt.-% | Polyol |
|---|---|---|---|---|---|---|
| hz190712-01 | 100.00 | Desmopan 385 S | x | 2012-020-4 (OMNIPUR MB 200) | x | x |
| hz190712-02 | 80.00 | Desmopan 385 S | 20.00 | 2012-020-4 (OMNIPUR MB 200) | x | x |
| hz190712-03 | 48.00 | Desmopan 385 S | 12.00 | 2012-020-4 (OMNIPUR MB 200) | 40.0 | Lupranol Balance 50 |

Extruder:
For the compounding (extrusion) a co-rotating double screw extruder was used (Leistritz Micro 27-36D, screw diameter=27 mm; L/D=36) together with a strand granulating system. The screw configuration is shown in FIG. 2.

Extrusion Parameters:

| Compounder | Zone 1 | Zone 2 | Zone 3 | Zone 4 | Zone 5 | Zone 6 | Zone 7 | Zone 8 | Zone 9 | Zone 10 |
|---|---|---|---|---|---|---|---|---|---|---|
| Set value | x | 150 | 160 | 170 | 170 | 180 | 180 | 190 | 190 | 190 |
| Actual value | x | 150 | 160 | 170 | 170 | 180 | 180 | 190 | 190 | 190 |

| Compounder | hz190712-01 | hz190712-02 | hz190712-03 |
|---|---|---|---|
| Screw speed (rpm) | 400 | 400 | 200-400 |
| Pressure (bar) | 27 | 40 | x |
| Temperature (° C.) | 204 | 206 | 199 |
| Extruder efficiency (%) | 79 | 62 | 30 |
| Degassing | yes | yes | no |
| GALA under water pelletizer | x | x | x |
| Die plate | x | x | x |
| Diverter valve | x | x | x |
| Cutter (rpm) | x | x | x |
| Strand pelletizer | yes | yes | x |
| Take-off speed (m/min) | 35 | 35 | x |
| Side-feeder (rpm) | 250 | 250 | x |
| Output Feeder | 10 | 10 | x |
| TPU | main hopper | main hopper | main hopper |
| Polyole | side feeder | side feeder | side feeder |

The substance resides in the extruder for 60 seconds.
Results:

| | |
|---|---|
| hz190712-01: | The process is stable |
| hz190712-02: | The process is stable |
| hz190712-03: | The process is unstable, the polyol components does not mix with the TPU/nanoclay mixture, the polyol component exits the extruder via the sidefeed and degassing dome. |

Example 2

TPU/TPU/Nanoclay, PC, PCL and Polyol-Leistritz-Extruder

This experiment tests the material combination of TPU/nanoclay with PC and PCL. A pre-mixture of TPU/nanoclay was produced. The polyol was added in zone 4.

The following mixtures were tested:

| No. | wt.-% | TPU | wt.-% | Masterbatch | wt.-% | Polyol | wt.-% | PC | wt.-% | PCL |
|---|---|---|---|---|---|---|---|---|---|---|
| hz230712-01 | 28.8 | Desmopan 385S | 7.20 | 2012-020-4 (OMNIPUR MB 200) | 24.0 | Lupranol Balance 50 | 28.0 | Makrolon 2405 | 12.0 | CAPA 6400 |

Extruder:

For the compounding (extrusion) a co-rotating double screw extruder was used (Leistritz Micro 27-36D, screw diameter=27 mm; L/D=36). The polyol was added via a Viscotec-pump in zone 4. A degassing was not used, in order to reduce the separation of polyol from the mixture.

The screw configuration is shown in FIG. 4.

| Compounder | Zone 1 | Zone 2 | Zone 3 | Zone 4 | Zone 5 | Zone 6 | Zone 7 | Zone 8 | Zone 9 | Zone 10 |
|---|---|---|---|---|---|---|---|---|---|---|
| Set value | x | 150 | 160 | 170 | 170 | 180 | 180 | 190 | 190 | 190 |
| Actual value | x | 150 | 160 | 170 | 170 | 180 | 180 | 190 | 190 | 190 |

| Compounder | hz230712-01 | Feeder | |
|---|---|---|---|
| Screw speed (rpm) | 200-400 | TPU | main hopper |
| Pressure (bar) | 30 | Polyole | side feeder |
| Temperature (° C.) | 190 | | |
| Extruder efficiency (%) | x | | |

| | |
|---|---|
| Degassing | no |
| GALA under water pelletizer | x |
| Die plate | x |
| Diverter valve | x |
| Cutter (rpm) | x |
| Strand pelletizer | yes |
| Take-off speed (m/min) | x |
| Side-feeder (rpm) | x |
| Output | 10 kg/h |

Extrusion Parameters:

The substance resides in the extruder for 60 seconds.

Results:

| | |
|---|---|
| hz230712-01: | The polyol component does not mix with the mixture, the polyol component exits the extruder via the sidefeed. A separation occurs within the extruder. |

Example 3

Production of a Polymer Blend without Polyol-Coperion-Extruder

This experiment demonstrates production of a homogenous mixture of all polymers. This mixture is to be subsequently re-processed in an extruder with mixture with a polyol.

| No. | wt.-% | TPU | wt.-% | Masterbatch | wt.-% | PC | wt.-% | PCL |
|---|---|---|---|---|---|---|---|---|
| hz230712-01 | 37.90 | Desmopan 385 S | 9.50 | 2012-020-4 (OMNIPUR MB 200) | 36.8 | Makrolon 2405 | 15.8 | CAPA 6400 |

Extruder:

For the blending procedure a co-rotating double screw extruder was used (Coperion ZSK 32 Megacompounder, screw diameter=32 mm; L/D=48). An underwater granulation was used from the company Gala.

The screw configuration is shown in FIG. 6.

Extrusion Parameters:

| Compounder | Zone 1 | Zone 2 | Zone 3 | Zone 4 | Zone 5 | Zone 6 | Zone 7 | Zone 8 | Zone 9 | Zone 10 | Zone 11 | Zone 12 | Zone 13 |
|---|---|---|---|---|---|---|---|---|---|---|---|---|---|
| Set value | x | 150 | 160 | 170 | 180 | 180 | 180 | 190 | 190 | 190 | 190 | 195 | 195 |
| Actual value | x | 150 | 160 | 170 | 180 | 180 | 180 | 190 | 190 | 190 | 190 | 195 | 195 |

| Compounder | hz230712-01 |
|---|---|
| Screw speed (rpm) | 400 |
| Pressure (bar) | 85 |
| Temperature (° C.) | x |
| Extruder efficiency (%) | 60 |
| Degassing | no |
| GALA under water pelletizer | x |
| Die plate | 190 |
| Diverter valve | 210 |
| Water | 50° C. |
| Cutter (rpm) | 4500 |
| Feeder | |
| TPU + PC PCL + Masterbatch | main hopper |
| Output | 40 kg/h |

Results:

| hz230712-01: | Production of the homogenous polymer blend was stable. The produced granulates had a round, even size and shape. |
|---|---|

Example 4

Compounding of the Polymer Blend with Polyol-Coperion-Extruder

In this experiment the experiments from example 3 are further examined. The blend is re-processed, meltined in an extruder and compounded with polyol.

| No. | wt.-% | Polymer blend | wt.-% | Polyol |
|---|---|---|---|---|
| hz240712-01 | 76.00 | hz230712-01 | 24.0 | Lupranol Balance 50 |
| hz240712-01 | 90.00 | hz230712-02 | 10.0 | Lupranol Balance 50 |

Extruder:

For the compounding procedure a co-roating double screw extruder was used (Coperion ZSK 32 Megacompounder, screw diameter=32 mm; L/D=48). The polyol was added via a Viscotec-pump in zone 4. An underwater granulation was used from the company Gala.

The screw configuration is shown in FIG. 8.

Extrusion Parameters:

| Compounder | Zone 1 | Zone 2 | Zone 3 | Zone 4 | Zone 5 | Zone 6 | Zone 7 | Zone 8 | Zone 9 | Zone 10 | Zone 11 | Zone 12 | Zone 13 |
|---|---|---|---|---|---|---|---|---|---|---|---|---|---|
| Set value | x | 150 | 160 | 170 | 180 | 180 | 180 | 190 | 190 | 190 | 190 | 195 | 195 |
| Actual value | x | 150 | 160 | 170 | 180 | 180 | 180 | 190 | 190 | 190 | 190 | 195 | 195 |

| Compounder | hz240712-01 | hz240712-02 |
|---|---|---|
| Screw speed (rpm) | 300 | 700 |
| Pressure (bar) | 24 | 10 |
| Temperature (° C.) | x | x |
| Extruder efficiency (%) | 21 | 19 |
| Degassing | no | no |
| GALA under water pelletizer | x | |
| Die plate | 190 | 190 |
| Diverter valve | 210 | 240 |
| Water | 30 | 30 |
| Cutter (rpm) | 2000-3000 | 2000-3000 |
| Strand pelletizer | x | x |
| Take-off speed (m/min) | x | x |
| Side-feeder (rpm) | x | x |
| Output | x | x |
| Verweilzeit Feeder | 60 sec | 60 sec |
| Output TPU + PC PCL + Masterbatch | 15.2 kg/h main hopper block 4 | 19 kg/h main hopper block 4 |
| Polyol Polyol Zugabe | 4.8 kg/h 24% Polyol | 1 kg/h 10% Polyol |

The substance resides in the extruder for 60 seconds.

Results:

| hz240712-01, hz240712-02: | The polyol component does not mix with the mixture, the polyol component exits the extruder via the sidefeed. |
|---|---|

Example 5

Viscosity Tests of the Produced Mixtures

A viscosity test was carried out using high pressure capillary viscometry. See FIG. 15. Through multiple thermal processing the viscosity of the mixture is significantly reduced (here for Desmopan 385 S).

| No. | wt.-% | TPU | wt-% | Masterbatch | Viscosity curve |
|---|---|---|---|---|---|
| raw material | | Desmopan 385 S | x | x | upper curve |
| hz190712-01 | 100.0 | Desmopan 385 S | x | 2012-020-4 (OMNIPUR MB 200) | middle curve |
| hz190712-02 | 80.0 | Desmopan 385 S | 20.0 | 2012-020-4 (OMNIPUR MB 200) | bottom curve |

Solubility Tests with TPU and Polyol

In a mixing container 60% Desmopan 385 S and 40% Lupranol Balance 50 were mixed for approx. 30 minutes and warmed to 170° C. After 5 hour cooling a gel-like thickening was observed. A complete solubility was not observed.

Conclusion from First Set of Experiments

The preliminary experiments showed that TPU and polyol did not mix sufficiently used the conditions described above (co-rotating double screw extruder).

Example 6

TPU, TPU/Nanoclay Und Polyol-Leistritz-Extruder

This experiment examines the processing of TPU and the TPU/masterbatch.

| No. | wt.-% | TPU | wt.-% | Masterbatch | wt.-% | Polyol |
|---|---|---|---|---|---|---|
| hz310312-03 | 51.00 | Desmopan 385S | 13.00 | 2012-20-4 (OMNIPUR MB 200) | 36.00 | Lupranol 4674-15 |
| hz310312-04 | 51.00 | Elastollan 1185A | 13.00 | 2012-20-3 (OMNIPUR MB 100) | 36.00 | Lupranol 4674-15 |
| hz310312-05 | 64.00 | | | hz230712-01 TPU-Blend | 36.00 | Lupranol 4674-15 |

The TPU-blend used has the following composition:

| No. | wt.-% | TPU | wt.-% | Masterbatch | wt.-% | PC | wt.-% | PCL |
|---|---|---|---|---|---|---|---|---|
| hz230712-01 | 37.90 | Desmopan 385 S | 9.50 | 2012-020-4 | 36.8 | Makrolon 2405 | 15.8 | CAPA 6400 |

Results:

| | |
|---|---|
| hz310312-03, hz310312-04, hz310312-05: | The polyol component does not mix entirely with the mixture, the polyol component exits the extruder via the sidefeed. |

Example 7

New Screw Concept-Leistritz-Extruder

This experiment investigates the processing of a TPU and TPU/masterbatch by means of a new screw concept.

Extruder:

For the compounding (extrusion) a co-rotating double screw extruder was used (Leistritz Micro 27-36D, screw diameter=27 mm; L/D=36) together with a strand granulating system. The screw configuration is shown in FIG. 10

Extrusion Parameters:

| Compounder | Zone 1 | Zone 2 | Zone 3 | Zone 4 | Zone 5 | Zone 6 | Zone 7 | Zone 8 | Zone 9 | Zone 10 |
|---|---|---|---|---|---|---|---|---|---|---|
| Set value | x | 150 | 160 | 170 | 170 | 180 | 180 | 190 | 190 | 190 |
| Actual value | x | 150 | 160 | 170 | 170 | 180 | 180 | 190 | 190 | 190 |

| Compounder | | | hz310712-03 | hz310712-04 |
|---|---|---|---|---|
| Screw speed (rpm) | | | 300 | 300 |
| Pressure (bar) | | | x | x |
| Temperature (° C.) | | | x | x |
| Extruder efficiency (%) | | | 31 | 32 |
| Degassing | | | x | x |
| GALA under water pelletizer | | | x | x |
| Die plate | | | x | x |
| Diverter valve | | | x | x |
| Cutter (rpm) | | | x | x |
| Strand pelletizer | | | yes | yes |
| Take-off speed (m/min) | | | x | x |
| Side-feeder (rpm) | | | x | x |
| Output | | | x | x |
| Verweilzeit | 60 sec | 60 sec | 60 sec | 60 sec |
| Feeder | | | | |
| TPU/Nanoclay | main hopper | main hopper | | |
| Polyole | side feeder | side feeder | | |

| No. | wt.-% | TPU | wt.-% | Masterbatch | wt.-% | Polyol |
|---|---|---|---|---|---|---|
| hz100812-01 | 80.00 | Desmopan 385S | x | 2012-20-4 | 20.00 | Lupranol 4674-15 |
| hz100812-02 | 70.00 | Desmopan 385S | x | 2012-20-4 | 30.00 | Lupranol 4674-15 |
| hz100812-03 | 60.00 | Desmopan 385S | x | 2012-20-4 | 40.00 | Lupranol 4674-15 |
| hz100812-04 | 80.00 | Elastollan 1185A | x | 2012-20-3 | 20.00 | Lupranol 4674-15 |
| hz100812-05 | 70.00 | Elastollan 1185A | x | 2012-20-3 | 30.00 | Lupranol 4674-15 |
| hz100812-06 | 60.00 | Desmopan 385S | x | 2012-20-3 | 40.00 | Lupranol 4674-15 |
| hz100812-07 | 65.00 | Desmopan 385S | 15.00 | 2012-20-4 | 20.00 | Lupranol 4674-15 |
| hz100812-08 | 57.00 | Desmopan 385S | 13.00 | 2012-20-4 | 30.00 | Lupranol 4674-15 |
| hz100812-09 | 65.00 | Elastollan 1185A | 15.00 | 2012-20-3 | 20.00 | Lupranol 4674-15 |
| hz100812-10 | 57.00 | Elastollan 1185A | 13.00 | 2012-20-3 | 30.00 | Lupranol 4674-15 |

Extruder:

For the compounding (extrusion) a co-rotating double screw extruder was used (Leistritz Micro 27-36D, screw diameter=27 mm; L/D=36) together with a strand granulating system. The screw configuration is shown in FIG. 12

Extrusion Parameters:

| Compounder | Zone 1 | Zone 2 | Zone 3 | Zone 4 | Zone 5 | Zone 6 |
|---|---|---|---|---|---|---|
| Set value | x | 150 | 170 | 170 | 170 | 170 |
| Actual value | x | 150 | 170 | 170 | 170 | 170 |

| Compounder | hz100812-01 | hz100812-01 | hz100812-02 | hz100812-03 | hz100812-04 | hz100812-05 |
|---|---|---|---|---|---|---|
| Screw speed (rpm) | 100 | 396 | 400 | x | 396 | 396 |
| Pressure (bar) | 8 | 8 | 8 | x | 8 | 8 |
| Temperature (° C.) | 183 | 185 | 85 | x | 185 | 185 |
| Extruder efficiency (%) | 55 | 43 | 40 | x | 44 | 40 |
| Degassing | x | x | x | x | x | x |
| GALA under water pelletizer | | | | | | |
| Die plate | | | | | | |
| Diverter valve | | | | | | |
| Cutter (rpm) | | | | | | |
| Strand pelletizer | | | | | | |
| Take-off speed (m/min) | | | | | | |
| Side-feeder (rpm) | | | | | | |
| Output | 10 | 10 | 10 | 10 | 10 | 10 |
| Remarks | Polyol löst sich nicht! | Polyol löst sich nicht sich! | Polyol löst sich nicht vollständig | Polyol löst sich nicht vollständig | Polyol löst sich nicht sich! | Polyol löst sich nicht vollständig |
| Feeder | | | | | | |
| TPU | main hopper | main hopper | main hopper | main hopper | main hopper | main hopper |
| Polyole | side feeder | side feeder | side feeder | side feeder | side feeder | side feeder |

| Compounder | Zone 7 | Zone 8 | Zone 9 | Zone 10 |
|---|---|---|---|---|
| Set value | 170 | 170 | 180 | 190 |
| Actual value | 170 | 170 | 180 | 190 |

| Compounder | hz100812-06 | hz100812-07 | hz100812-08 | hz100812-09 | hz100812-10 |
|---|---|---|---|---|---|
| Screw speed (rpm) | 400 | 400 | 400 | 400 | 400 |
| Pressure (bar) | 8 | 8 | 9 | x | x |
| Temperature (° C.) | 184 | 183 | 184 | x | x |
| Extruder efficiency (%) | 39 | 41 | 40 | x | x |
| Degassing | x | x | x | x | x |
| GALA under water pelletizer | | | | | |
| Die plate | | | | | |
| Diverter valve | | | | | |
| Cutter (rpm) | | | | | |
| Strand pelletizer | | | | | |
| Take-off speed (m/min) | | | | | |
| Side-feeder (rpm) | | | | | |
| Output | 10 | 10 | 10 | 10 | 10 |

-continued

| Remarks | Polyol löst sich nicht vollständig | Polyol löst sich nicht vollständig | Polyol löst sich nicht vollständig | Polyol löst sich nicht vollständig | Polyol löst sich nicht vollständig |
|---|---|---|---|---|---|
| Feeder | | | | | |
| TPU | main hopper | main hopper | main hopper | main hopper | main hopper |
| Polyole | side feeder | side feeder | side feeder | side feeder | side feeder |

Results:

| No. | Comments | Product |
|---|---|---|
| hz100812-01 | Polyol is not soluble | Smooth, white |
| hz100812-02 | Polyol is not soluble after 1 minute | Smooth, white, polyol in Sidefeeder. |
| hz100812-03 | Polyol is not soluble after 1 minute | Strand breaks, polyol in Sidefeeder. |
| hz100812-04 | Polyol is soluble | Smooth, white, oily |
| hz100812-05 | Polyol is not soluble after 1 minute | Smooth, white, polyol in Sidefeeder. |
| hz100812-06 | Polyol is not soluble after 1 minute | Strand breaks, polyol in Sidefeeder. |
| hz100812-07 | Polyol is not soluble after 3 minutes | Yellowish, smooth, oily, polyol in Sidefeeder. |
| hz100812-08 | Polyol is not soluble after 5 minutes | Yellowish, smooth, oily, polyol in Sidefeeder. |
| hz100812-09 | Polyol is not soluble after 1 minute | Strand breaks, polyol in Sidefeeder. |
| hz100812-10 | Polyol is not soluble after 1 minute | Strand breaks, polyol in Sidefeeder. |

It can be concluded, that the polyol component does not show solubility at a dosage of 20% in a TPU/nanoclay matrix, whereby the polyol exits the extruder in the sidefeeder in these copounding attempts. The experiments conducted with the co-rotating double screw extruder show a poor polyol solubility with TPU/nanoclay mixtures.

Example 8

Experimentation with an Alternative Single Screw Extruder Principle

The BUSS-Ko-Kneter is a single screw type extruder. Its distinguishing feature is that the screw shaft oscillates axially once per revolution in sinusoidal motion generated by a synchronized drive. The characteristic kneading flights on the screw shaft interact with fixed kneading teeth or kneading bolts inside the Kneader barrel so that the various ingredients are sheared between them much more directly and rapidly than with other systems. Furthermore, the oscillating screw shaft ensures intensive mixing in the axial direction through repeated product separation, folding and reorientation.

The following mixtures were generated:
1) Mixture 1
20% Lupranol 4674-15
15% MB 2012-20-3 (OMNIPUR MB 100)
65% Elastollan 1185A
2) Mixture 2 (PTI TPU-2)
20% Lupranol 4674-15
15% MB 2012-20-4 (OMNIPUR MB 200)
65% Desmopan 385S
3) Mixture 3
34% Lupranol 4674-15
15% MB 2012-20-3 (OMNIPUR MB 100)
51% Elastollan 1185A The extrusion parameters were as follows:

The extruder is a 44D extruder, meaning 44×53=2.33 m. There are 11 temperature zones along the extruder, and 8 in the die, sieve and neck. Every temperature zone is 212 mm (21.2 com). The screw is 53 mm, co-rotating, 3 lobs, 44D. The screw design is as follows:

| Screw Design | | Screw length (mm) | Temperature zones |
|---|---|---|---|
| 500 mm | Transport | 500 | 1, 2, 3 |
| 225 mm | Transport fine | 225 | 3; 4 |
| 250 mm | Kneading coarse | 250 | 4; 5 |
| 50 mm | Kneading left rotating | 50 | 4; 5 |
| 300 mm | Transport | 300 | 5; 6; 7 |
| 75 mm | Transport fine | 75 | 7 |
| 150 mm | Kneading coarse | 150 | 7; 8 |
| 50 mm | Kneading fine | 50 | 8 |
| 50 mm | Kneading left rotating | 50 | 8 |
| 200 mm | Transport | 200 | 8; 9 |
| 150 mm | Kneading coarse | 150 | 9; 10 |
| 330 mm | Transport + Pressure build up | 330 | 10; 11 |

The feeder settings and temperature zones are described as follows:

| Feeder | Additive | Setting 1 Set value | Setting 2 Set Value | |
|---|---|---|---|---|
| 1 | Polymer | 51% | 65% | |
| 2 | Masterbatch | 15% | 15% | |
| 3 | Liquid | 34% | 20% | |

| Zone | Set Temperature Value (° C.) | Setting 1 Actual Temperature Value (° C.) | Setting 2 Actual Temperature Value (° C.) | |
|---|---|---|---|---|
| 1 | 60 | 60 | 60 | |
| 2 | 200 | 200 | 200 | |
| 3 | 200 | 177 | 169 | |
| 4 | 175 | 174 | 176 | |
| 5 | 175 | 122 | 114 | Liquid injection |
| 6 | 175 | 168 | 168 | |
| 7 | 175 | 174 | 175 | |
| 8 | 175 | 169 | 158 | |
| 9 | 175 | 161 | 130 | |
| 10 | 175 | 169 | 176 | |
| 11 | 175 | 171 | 179 | |
| 12 | 175 | 168 | 173 | |
| 13 | 175 | 164 | 175 | |
| 14 | 175 | 150 | 159 | |
| 15 | 175 | 170 | 169 | |
| 16 | 175 | 174 | 173 | |
| 17 | 175 | 174 | 175 | |
| 18 | 175 | 174 | 175 | |
| 19 | 180 | 180 | 180 | |
| Mass | | 155 | 164 | |
| Screw speed | (min$^{-1}$) | 150 | 165 | |
| Torque | (Ampère) | 24 | 20 | Maximum 100 |
| Mass pressure | (Bar) | 29 | 25 | |
| Output | (kg/h) | 23.5 | 23.5 | |

Mixture 1 was produced without any major problems. The extrusion was stable and the extruded fibres were dry. The fibres were very smooth, yellowish/white in colour and rubbery.

Mixture 2 was produced without any major problems. The extrusion was stable and the extruded fibres were dry but slightly sticky. The fibres were very smooth, yellowish/white in colour and rubbery.

Mixture 3 proved very difficult due to "plug-flow" behaviour. The liquid polyol was ejected every few minutes from the die into the water bath. The extruded fibres were foamy and had a very rough surface. The fibres were wet, have a rough surface and are yellowish and rubbery.

In conclusion, the combination of 15% masterbatch with 65% TPU and 20% polyol was easily processed, without any air inclusions. 15% masterbatch with 51% TPU and 34% polyol was processable, but showed some instability.

Example 9

Compounding of PTI TPU-2 with PC/PCL

| | |
|---|---|
| PTI TPU-2: | 20% Lupranol 4674-15 |
| | 15% MB 2012-20-4 (OMNIPUR MB 200) |
| | 65% Desmopan 385S |
| Polycarbonat (PC): | Makrolon 2405 |
| Polycaprolacton (PCL) | CAPA 6400 |

In this experiment the mixture produced via single screw extrusion (PTI TPU-2 of mixture 2, as described above in Example 3) is compounded with makrolon (PC) and PCL.

| No. | wt.-% | TPU-2 | wt.-% | PC | wt.-% | PCL |
|---|---|---|---|---|---|---|
| hz130812-01 | 60.00 | PTI TPU-2 | 28.00 | Makrolon 2405 | 12.00 | CAPA 6400 |

Extruder:

For the compounding (extrusion) a co-rotating double screw extruder was used (Leistritz Micro 27-36D, screw diameter=27 mm; L/D=36) together with a strand granulating system. The screw configuration is shown in FIG. 14

Extrusion Parameters:

| Compounder | Zone 1 | Zone 2 | Zone 3 | Zone 4 | Zone 5 | Zone 6 | Zone 7 | Zone 8 | Zone 9 | Zone 10 |
|---|---|---|---|---|---|---|---|---|---|---|
| Set value | x | 165 | 175 | 175 | 175 | 175 | 175 | 175 | 175 | 185 | 185 |
| Actual value | x | 165 | 175 | 175 | 175 | 175 | 175 | 175 | 175 | 185 | 185 |

| Compounder | hz130812-01 |
|---|---|
| Screw speed (rpm) | 400 |
| Pressure (bar) | 8 |
| Temperature (° C.) | 188 |
| Extruder efficiency (%) | 20 |
| Degassing | x |
| Strand pelletizer | |
| Take-off speed (m/min) | 30 |
| Side-feeder (rpm) | x |
| Output kg/h | 5-8 |
| Remarks | i.O. |

The substance resides in the extruder for 90 seconds.
Results:

| | |
|---|---|
| hz130812-01: | The process was stable, the granulate has a white colour and even round form. |

CONCLUSION

In conclusion, the method as described above produced a novel synthetic material. The single screw extrusion mixture (to include polyol) to produce PTI TPU-2 (of example 8) was expecially beneficial. The compound TPU-3 (hz130812-01) was finally produced. The compound contains:

| substance | comment | content |
|---|---|---|
| TPU | Desmopan 385 S | A: 47.712% or B: 47.946% |
| Polyol | Lupranol 4674-15 | 12.0% |
| Nanoclay | Perkalite F 100 | A: 0.288% or B: 0.054% |
| Polycarbonat (PC) | Makrolon 2405 | 28.0% |
| Polycaprolacton (PCL) | CAPA 6400 | 12.0% |

Provided Below are Technical Data for the Extruder: Leistritz Micro 27/GL-36D

| Extruder parameters | |
|---|---|
| Extruder type | Micro 27/GL - 36D |
| Company | Leistritz |

-continued

| Extruder parameters | | |
|---|---|---|
| Outer screw diameter ($D_a$) | 27 | in mm |
| Inner screw diameter ($D_i$) | 18.5 | in mm |
| Center line distance (a) | 23 | in mm |
| L/D | 36 | x |
| max. torque $M_{max}$ (for one screw shaft) | 100 | in Nm |
| max. drive power (P) | 8.4 | in kW |
| max. screw speed ($n_{max}$) | 400 | rpm |
| Diameter ratio ($D_a/D_i$) | 1.46 | x |
| Specific torque ($M_{max}/a^3$) | 8.2 | Nm/m³ |

Leistritz Micro 27/GL-40D

| Extruder parameters | | |
|---|---|---|
| Extruder type | Micro 27/GL - 40D | |
| Company | Leistritz | |
| Outer screw diameter ($D_a$) | 27 | in mm |
| Inner screw diameter ($D_i$) | 18.5 | in mm |
| Center line distance (a) | 23 | in mm |
| L/D | 40 | x |
| max. torque $M_{max}$ (for one screw shaft) | 100 | in Nm |
| max. drive power (P) | 10.5 | in kW |
| max. screw speed ($n_{max}$) | 500 | rpm |
| Diameter ratio ($D_a/D_i$) | 1.46 | x |
| Specific torque ($M_{max}/a^3$) | 8.2 | Nm/m³ |

Coperion ZSK 32 MegaCompounder

| Extruder parameters | | |
|---|---|---|
| Extruder type | ZSK 32 MegaCompounder | |
| Company | Coperion | |
| Outer screw diameter ($D_a$) | 31.6 | in mm |
| Inner screw diameter ($D_i$) | 20.4 | in mm |
| Center line distance (a) | 26 | in mm |
| L/D | 48 | x |
| max. torque $M_{max}$ (for one screw shaft) | 245 | in Nm |
| max. drive power (P) | 65 | in kW |
| max. screw speed ($n_{max}$) | 1200 | rpm |
| Diameter ratio ($D_a/D_i$) | 1.55 | x |
| Specific torque ($M_{max}/a^3$) | 13.9 | Nm/m³ |

The invention claimed is:

1. Method for isocyanate-free production of a synthetic material product I comprising
   a) mixing thermoplastic polyurethane (TPU) and a nanoclay component comprising
      i. mixing 70-90 wt % of the TPU with 10-30 wt % of the nanoclay component, wherein intermediate product Ia is produced, followed by
      ii. mixing 90-99 wt % of the TPU with 0.1-10 wt % of the intermediate product Ia, wherein intermediate product I is produced,
   b) mixing 10-90% of the intermediate product I obtained from a) with 8-30 wt % of a polyol component, and optionally additional TPU, wherein intermediate product II is produced,
   c) mixing 50-70 wt % of the intermediate product II obtained from b) with 20-40 wt % polycarbonate (PC) and/or 6-18 wt % polycaprolactone component (PCL), wherein the synthetic material product I is produced,
   wherein one or more for said mixings in a) to c) occurs in a segmented single, twin or multiple screw melt extruder at melting temperatures between 80 and 300 degrees C. and wherein no isocyanate is produced in a) to c).

2. The method of claim 1, wherein product I is subsequently processed to produce product II via extrusion, blowing, casting, grinding and/or spraying, to obtain particles, granules, films, fibres, foams, strands, sheets and/or foils.

3. The method of claim 1, wherein the mixing in a) i) occurs at a ratio of 80 wt % TPU and 20 wt % nanoclay component.

4. The method of claim 3, wherein the mixture in a) ii) occurs at a ratio of 97 wt % TPU and 3 wt % intermediate product Ia.

5. The method of claim 1, wherein the mixing in b) of claim 1 occurs at a ratio of 70-90 wt %, preferably 80 wt % absolute TPU (considering the TPU present in the intermediate product I in addition to optionally additionally added TPU), 10-90% intermediate product I and 8-30 wt %, preferably 20 wt %, polyol component.

6. The method of claim 1, wherein the mixing in c) occurs at a ratio of 60 wt % intermediate product II, 28 wt % PC component and 12 wt % PCL component.

7. The method of claim 1, wherein the mixing in one or more of a) to c) occurs in a single screw extruder.

8. The method of claim 1, wherein the melting temperatures for one or more of the mixing in a) to c) is between 140 to 250.

9. The method of claim 1, wherein the heating segments of the extruder exhibit different temperatures, wherein the temperatures in the segments increases with progression of the mixture through the extruder.

10. The method of claim 1, wherein the extruder exhibits 3 to 20 heating segments, wherein the temperature increases step-wise from 80 to 300 degrees C. with progression of the mixture through the extruder.

11. The method of claim 1, wherein the extruder exhibits a screw of 3 to 20 screw segments, wherein the screw rotates to homogenise the mixture, whereby the screw segments can exhibit the same or different configurations, which in turn determine homogenisation of the mixture.

12. The method of claim 11, wherein the screw speed of the extruder is set to a value between 50 to 1000 revolutions per minute (rpm).

13. The method of claim 1, wherein the mixture of one or more steps is cooled after extrusion.

14. Synthetic material produced by the method of claim 1.

15. Synthetic material comprising the following components adding to 100 wt %:
   30 to 60 wt % TPU,
   8 to 30 wt % Polyol,
   0.001 to 5 wt % Nanoclay,
   20 to 40 wt % polycarbonate (PC), and
   6 to 18 wt % polycaprolactone (PCL).

16. The synthetic material of claim 15, comprising 47.712 wt % TPU, 12.0 wt % Polyol, 0.288 wt % Nanoclay, 28 wt % PC and 12 wt % PCL.

17. The synthetic material of claim 15, comprising 47.946 wt % TPU, 12.0 wt % Polyol, 0.054 wt % Nanoclay, 28 wt % PC and 12 wt % PCL.

18. The method of claim 10, wherein the extruder exhibits 5 to 15 or 7 to 12 heating segments, wherein the temperature increases step-wise from 140 to 250 degrees C. with progression of the mixture through the extruder.

19. The synthetic material of claim 15, comprising the following components adding to 100 wt %:
   45 to 55 wt % TPU,
   10 to 14 wt % Polyol,
   0.01 to 2 wt % Nanoclay,
   25 to 30 wt % polycarbonate (PC), and
   10 to 14 wt % polycaprolactone (PCL).

20. The method of claim 8, wherein the melting temperatures for one or more of the mixing in a) to c) is approximately 200 degrees C.

21. The method of claim 11, wherein the extruder exhibits a screw of 5 to 15 screw segments.

22. The method of claim 12, wherein the screw speed of the extruder is set to a value between 150 to 700 rpm or 250 to 500 rpm.

23. A method for isocyanate-free production of a synthetic material comprising
   a) mixing thermoplastic polyurethane (TPU) and a nanoclay component comprising
      i. mixing 70-90 wt % of the TPU with 10-30 wt % of the nanoclay component, followed by
      ii. mixing 90-99 wt % of the TPU with 0.1-10 wt % of (i),
   b) mixing 10-90% of a product obtained from a) with 8-30 wt % of a polyol component, and optionally additional TPU,
   c) mixing 50-70 wt % of a product obtained from b) with 20-40 wt % polycarbonate (PC) and/or 6-18 wt % polycaprolactone component (PCL) to obtain the synthetic material,
   wherein one or more for said mixings in a) to c) occurs in a segmented single, twin or multiple screw melt extruder at melting temperatures between 80 and 300 degrees C. and wherein no isocyanate is produced in a) to c).

* * * * *